US010267677B1

(12) United States Patent
Sarkar et al.

(10) Patent No.: US 10,267,677 B1
(45) Date of Patent: Apr. 23, 2019

(54) CALIBRATED BRIGHTNESS ESTIMATION USING AMBIENT COLOR SENSORS

(71) Applicant: MICROSOFT TECHNOLOGY LICENSING, LLC, Redmond, WA (US)

(72) Inventors: Abhijit Sarkar, Woodinville, WA (US); Shibu Kizhakke Vallathai, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/040,498

(22) Filed: Jul. 19, 2018

Related U.S. Application Data

(63) Continuation-in-part of application No. 15/944,771, filed on Apr. 3, 2018.

(51) Int. Cl.
  *G01N 21/25* (2006.01)
  *G01J 1/44* (2006.01)
  *G01J 1/42* (2006.01)

(52) U.S. Cl.
  CPC .............. *G01J 1/44* (2013.01); *G01J 1/4204* (2013.01); *G01J 1/4228* (2013.01); *G01J 2001/444* (2013.01)

(58) Field of Classification Search
  CPC .......... G01J 1/44; G01J 1/4204; G01J 1/4228; G01J 2001/444; G01J 3/02; G01J 3/50; G01J 3/463; G09G 5/06; G09G 3/34; G09G 3/20
  See application file for complete search history.

(56) References Cited

U.S. PATENT DOCUMENTS

| 8,648,550 | B2 | 2/2014 | Staab |
| 9,163,990 | B2 | 10/2015 | Lianza et al. |
| 2010/0085487 | A1 | 4/2010 | Sarkar et al. |
| 2010/0163717 | A1 | 7/2010 | Chang et al. |
| 2012/0001841 | A1 | 1/2012 | Gokingco et al. |
| 2013/0033528 | A1 | 2/2013 | Sarkar et al. |
| 2014/0044352 | A1 | 2/2014 | Sarkar et al. |
| 2014/0247984 | A1 | 9/2014 | Sarkar |
| 2015/0092186 | A1 | 4/2015 | Wieser et al. |
| 2015/0235348 | A1 | 8/2015 | Sarkar et al. |
| 2016/0104284 | A1 | 4/2016 | Maguire et al. |
| 2016/0232828 | A1 | 8/2016 | Jia et al. |
| 2016/0370231 | A1 | 12/2016 | Agahian et al. |
| 2017/0084250 | A1* | 3/2017 | Jia .............................. G09G 5/06 |
| 2017/0345352 | A1 | 11/2017 | Hernminki et al. |

* cited by examiner

*Primary Examiner* — Jamil Ahmed
(74) *Attorney, Agent, or Firm* — NovoTechIP International PLLC

(57) ABSTRACT

Calibrated brightness estimation using an ambient color sensor, involving determination and use of lighting cluster parameters effective for automatically identifying which of multiple lighting clusters is associated with a color measurement obtained for the ambient color sensor, and per-cluster sensor brightness estimation factors for each of the first plurality of lighting clusters.

16 Claims, 18 Drawing Sheets

CALIBRATED BRIGHTNESS ESTIMATION USING AMBIENT COLOR SENSORS

REFERENCE TO RELATED APPLICATIONS

This application is a continuation in part claiming a benefit of priority from pending U.S. patent application Ser. No. 15/944,771, filed on Apr. 3, 2018, and entitled "Color Sensing Ambient Light Sensor Calibration," which is incorporated by reference herein in its entirety. Additionally, pending U.S. patent application Ser. No. 15/969,735, filed on May 2, 2018, and entitled "Use of Multiple Calibrated Ambient Color Sensor Measurements to Generate a Single Colorimetric Value," is also incorporated by reference herein in its entirety.

BACKGROUND

Spectral sensitivities for various components or channels of an ambient color sensor do not often match those of the human visual system. As a result, additional mathematical steps in the form of sensor calibration are necessary to obtain accurate color coordinate value outputs. For example, a color conversion matrix can be used to convert color component values provided by the ambient color sensor into coordinates for standard color spaces (for example, CIE 1931 XYZ tristimulus values). However, the conversion matrix tends to differ widely based on the nature of a light source and its underlying spectral characteristics.

To develop a sensor calibration that provides accurate color values across a wide range of ambient lighting scenarios can involve collecting and processing many measurements obtained by exposing an ambient color sensor to many different ambient lighting scenarios. This can make robust and accurate sensor calibration a time-consuming process that is not ideal for implementing a per-sensor factory calibration for ambient color sensors and the electronic devices which incorporate them. Yet per-sensor calibration is very useful towards achieving accurate brightness estimates despite manufacturing variations in spectral response. There is a need for a per-sensor calibration process that is robust and accurate across a wide range of ambient lighting scenarios, while reducing the time required to characterize individual sensors to achieve a factory calibration process that is both accurate and efficient.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

In FIGS. 5D and 5E, a multi-step clustering, involving first and second automated clusterings, is performed.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

Figure 1:
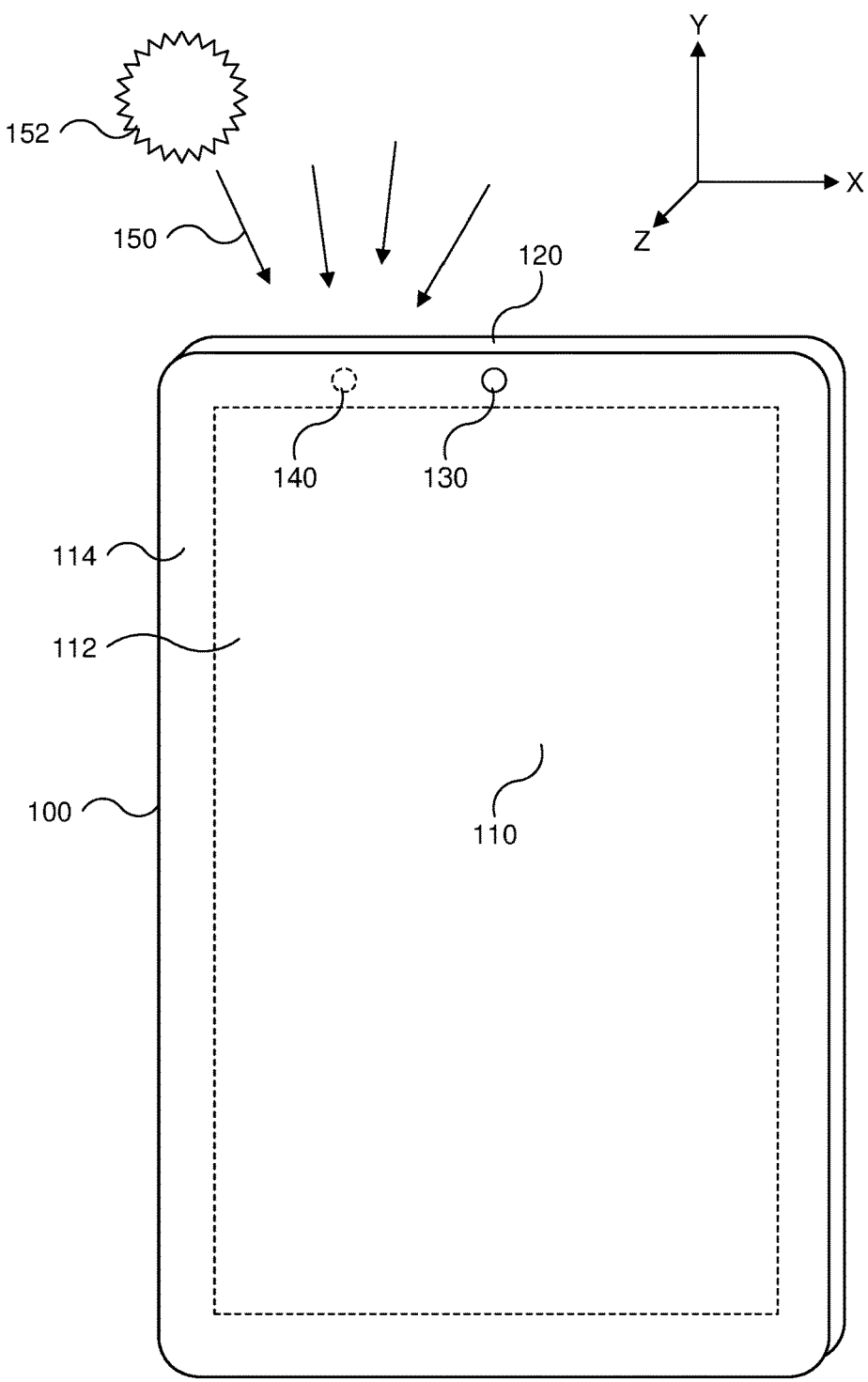
FIG. 1 illustrates an external view of an illustrative electronic device.

FIG. 1 illustrates an external view of an illustrative electronic device 100. In the particular example illustrated in FIG. 1, the electronic device 100 is embodied as a portable tablet computing device. Electronic device 100 may also be embodied as other computing devices such as, but not limited to, a laptop computer, a desktop computer and monitor, a smartphone, a media player, an image recorder (for example, a still image camera, video camera, or device including a still image and/or video camera), or other handheld or portable electronic device, a smaller device such as a wrist-watch device, a pendant device, a headphone or earpiece device, a device embedded in eyeglasses or other equipment worn on a user's head, or other wearable or miniature device, a television, a computer display, a gaming device, a navigation device, an embedded system such as a system in which electronic equipment with a display is mounted in a kiosk or automobile, equipment that implements the functionality of two or more of these devices, or other electronic equipment. The electronic device 100 may be more simply referred to as a device.

In the particular example illustrated in FIG. 1, the electronic device 100 includes a display device 110 (which may be referred to as a display) mounted in a housing 120 (which may be referred to as an enclosure or case). The display device 110 may be protected by a cover layer comprising materials such as, but not limited to, glass, plastic, or sapphire. One or more openings may be formed in the cover layer and/or the housing 120 to accommodate components such as, but not limited to, buttons, speakers, communications ports, and sensors. The display device 110 includes an array of pixel elements arranged to emit light through the cover layer to a user of the electronic device 100 in response to signal received from control circuitry included in the electronic device 100. The display device 100 may be implemented using liquid crystal display (LCD), organic light emitting diode (OLED), or other display technologies. The array of pixel elements defines an active area 112 used to display images.

In some embodiments, an inactive area 114 may run along one or more edges of the active area 112. The inactive area 114 may be referred to as a bezel. In FIG. 1, the inactive area 114 forms a border running fully around the active area 112. The inactive area 114 may contain circuits, signal lines, sensors, or other structures, some or all of which may be hidden from view of a user of the electronic device 100 with an opaque masking layer, such as a layer of black ink or paint on an underside of the cover layer. Optical components (for example, a camera, camera flash lighting, a light-based proximity sensor, an ambient color sensor (which may be referred to as a "color sensing ambient light sensor" or a "light sensor"), and/or status indicator light-emitting elements) may be positioned under the inactive area 114. One or more openings (which may be referred to as windows or apertures) may be formed in the opaque masking layer to accommodate such optical components. In some implementations, the optical components may instead be positioned under the active area 112 and arranged to receive and/or transmit light through the display device 110. In such implementations, the electronic device 100 may not include the inactive area 114, and instead have the active area 112 occupy substantially all of the front surface of the electronic device 100, providing a front display surface without, or substantially without, a bezel.

In FIG. 1, a first opening 130 is provided in the inactive area 114 for a camera. In some examples, another type of sensor may be used instead of, or in addition to, the camera in combination with the first opening 130. The first opening 130 provides a substantially clear, non-opaque, region in the inactive layer 114 that minimizes a reduction in optical transmission to the camera, although also making the first opening 130 and the camera visible to a user of the electronic device 100. FIG. 1 also includes a second opening 140 provided for an ambient color sensor. In this example, an ink or other material, which may be different in material composition and/or structure than other opaque areas of the inactive area 114, is used for the second opening 140, which obscures the presence of the second opening 140 to a user of the electronic device 110. Although optical transmission is reduced through the second opening 140, there remains sufficient optical transmission at appropriate wavelengths for the ambient color sensor to receive and accurately measure ambient light 150 (for example, light emitted by a light source 152) through the second opening 140. The first opening 130 and/or the second opening 140 may each have a circular shape, a square shape, a shape with curved and/or straight edges, or any other suitable shape.

Figure 2:
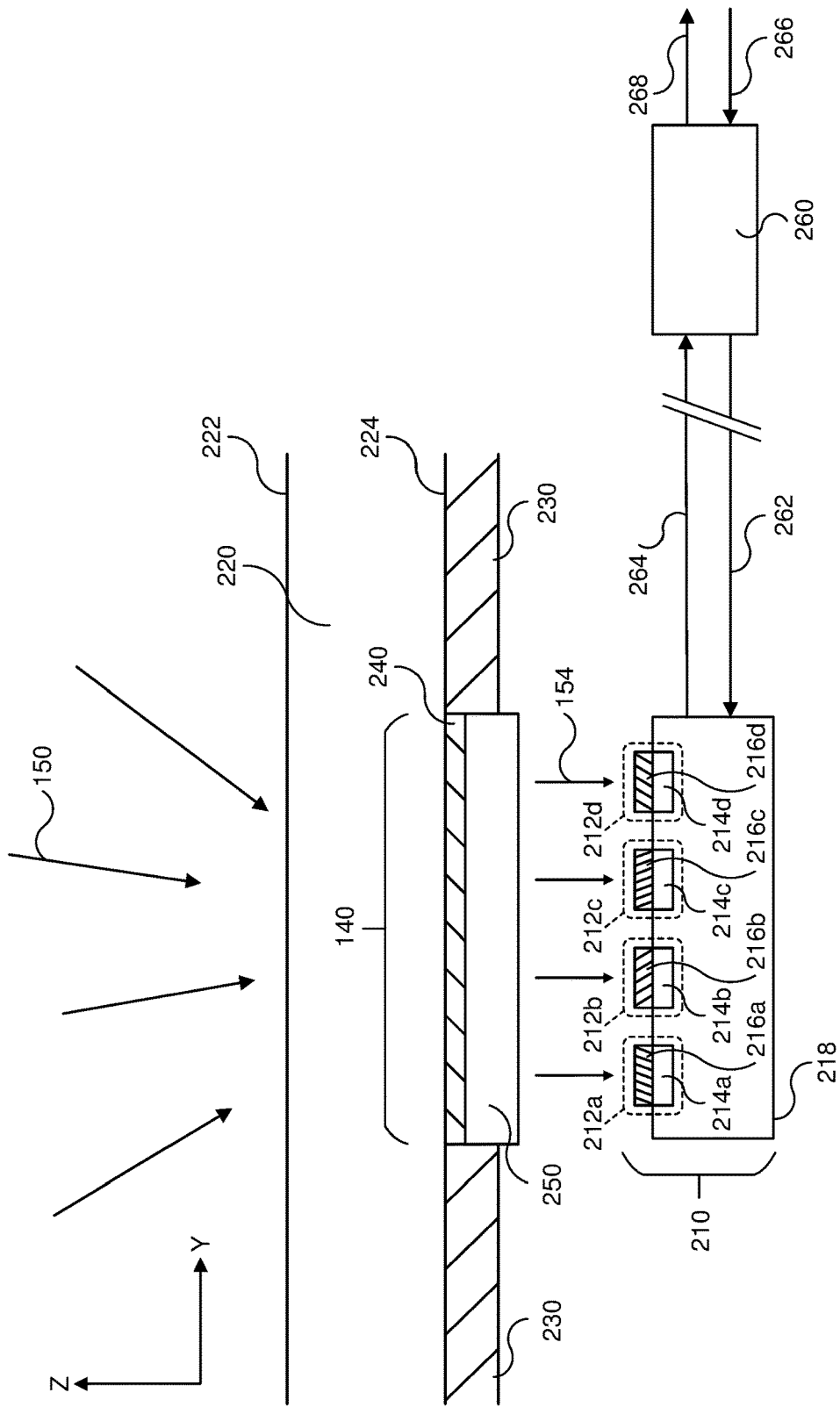
FIG. 2 is a cross-sectional view of a portion of the electronic device in FIG. 1 through an opening and an ambient color sensor arranged to receive ambient light through the opening.

FIG. 2 is a cross-sectional view of a portion of the electronic device 100 in FIG. 1 through the second opening 140 and an ambient color sensor 210 arranged to receive ambient light 150 through the second opening 140. As illustrated in FIG. 2, the ambient color sensor 210 may be mounted in alignment with the second opening 140. In the illustrated arrangement, the ambient color sensor 210 is used to measure and estimate various characteristics of ambient light 150 in the vicinity of the electronic device 100. As described in FIG. 1 and illustrated in FIG. 2, the electronic device 100 may include a cover layer 220 as an outermost and frontmost layer. In some implementations, the cover layer 220, or a portion of the cover layer 220, is a multilayer structure. The cover layer 220 has an outer surface 222 and an inner surface 224.

The second opening 140 may be formed from an opening in opaque masking layer 230 on the inner surface 224. The opening in the opaque masking layer 230 associated with the second opening 140 may be filled with optical structures such as an ambient light sensor ink 240 and/or light redirecting structure 250. Ambient light sensor ink 240 may have sufficient optical transmission at appropriate wavelengths for the ambient color sensor 210 to receive and accurately measure ambient light 150, while at the same time enhancing the outward appearance of the second opening 140 (for example, by obscuring the presence of the second opening 140 to a user of the electronic device 100 by making the second opening 140 have a visual appearance that is similar to a portion of the cover layer 220 that includes the opaque masking layer 230). If desired, the ambient light sensor ink 240 may be omitted for the second opening 140.

The light redirecting structure 250 may be used to pass ambient light 150 gathered from various angles of incidence to the ambient color sensor 210. The light redirecting structure 250 may include structures such as diffusers, prisms, and/or patterned lenses to help redirect off-axis rays of ambient light 150 onto the ambient color sensor 210 at angles that are close to parallel to the Z axis (for example, ambient light ray 154), thereby reducing the dependence of ambient light measurements on a relative orientation between the electronic device 100 and the source(s) of ambient light 150. If desired, the light redirecting structure 250 may be omitted for the second opening 140.

The ambient color sensor 210 includes multiple light detectors 212a, 212b, 212c, and 212d, which may be collectively referred to as light detectors 212. The light detectors 212a, 212b, 212c, and 212d include respective photodetectors 214a, 214b, 214c, and 214d (for example, photodiodes, phototransistors, or other semiconductor photodetector structures). The light detectors 212 may be formed on a common semiconductor substrate such as substrate 216 or may be formed using two or more substrates. In some implementations, multiple openings, similar to the second opening 140, may be disposed at various positions and used for the ambient color sensor 210. Each of the light detectors 212a, 212b, 212c, and 212d may include a respective color filter 216a, 216b, 216c, and 216d. The color filters 216a, 216b, 216c, and 216d may be collectively referred to as color filters 216. The color filters 216 may be, for example, thin-film interference filters, colored layers of polymer, or other color filter elements (for example, colored filters formed using dyes and/or pigments) formed on or otherwise positioned above photodetectors 214. The light detectors 212 have substantially different spectral responses to received light, which may be due to, at least in part, substantially different spectral transmission characteristics for the color filters 216. Each light detector 212 provides an indication of an amount or intensity of received ambient light according to its spectral response. Although in the example illustrated in FIG. 2 the ambient color sensor 210 includes four light detectors 212a, 212b, 212c, and 212d, in other examples the ambient color sensor 210 may include three light detectors 212 or more than four light detectors 212, with corresponding adjustments to the techniques described herein for use and operation of the ambient color sensor 210.

The ambient color sensor 210 receives and responds to control signals 262 received from control circuitry 260 included in the electronic device 100. The control circuitry 260 is not illustrated in cross-section in FIG. 2, but instead is illustrated schematically. The ambient color sensor 210 generates and outputs sensor signals 264 indicating, among other things, amounts of light measured by the light detectors 212, which is received by the control circuitry 260. The control circuitry 260 also receives input signals 266 from other elements of the electronic device 100. In response to the sensor signals 264 and/or the input signals 266, the control circuitry generates output signals 268, which are provided to and affect the operation of other elements included in the electronic device 100. For example, the control circuitry 260 may be configured to, in response to the sensor signals 264 and input signals 266 providing image data intended for display via the display device 110, adjust a color cast of the image data (often referred to as the white point) and provide corresponding output signals 268 to the display device 110.

Figure 3A:
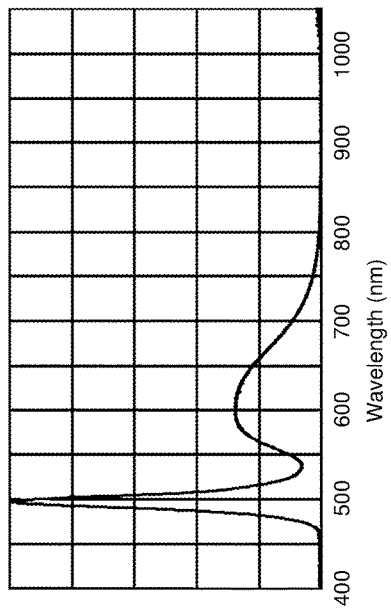
FIGS. 3A-3D illustrate examples of spectral emission profiles for various types of light sources.
Figure 3B:
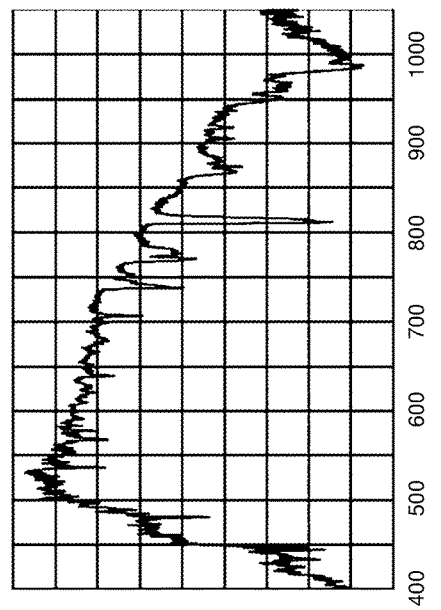
Figure 3C:
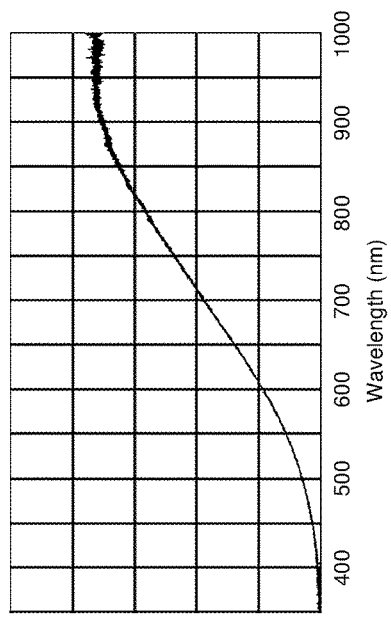
Figure 3D:
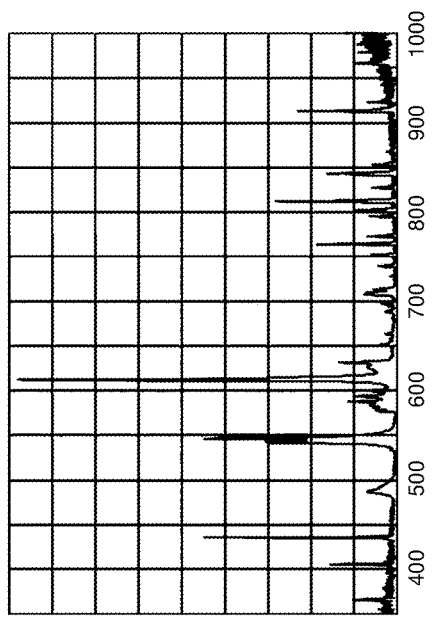

FIGS. 3A-3D illustrate examples of spectral emission profiles for various types of light sources. FIG. 3A illustrates a spectral emission profile for an example halogen bulb based light source. FIG. 3B illustrates a spectral emission profile for an example white light emitting diode (LED) based light source. FIG. 3C illustrates a spectral emission profile for an example fluorescent light based light source. FIG. 3D illustrates a spectral emission profile for sunlight. As can be seen from the examples in FIGS. 3A-3D, spectral emission profiles may vary widely across various light sources. Even where two light sources are determined to have a similar color temperature, they may have very different spectral emission profiles. For example, a halogen bulb with 3000K color temperature has a significantly different spectral emission profile from a 3000K warm white LED lamp and a 3000K warm white compact fluorescent light (CFL). This introduces challenges in accurately estimating color chromaticities for different ambient lighting circumstances based on measurements obtained using the light detectors 212 included in the ambient color sensor 210.

Figure 3E:
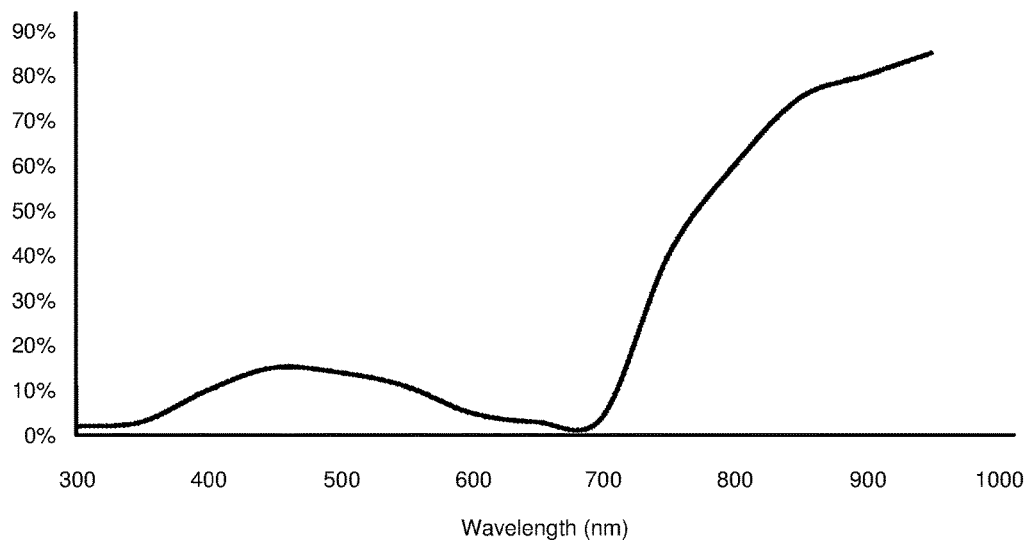
FIG. 3E illustrates an example of a spectral transmission profile for an ambient light sensor ink.

FIG. 3E illustrates an example of a spectral transmission profile for an ambient light sensor ink, such as the ambient light sensor ink 240. As seen in FIG. 3E, there is very low transmission of visible light through the ambient light sensor ink, while there is an increasing and significantly greater transmission of infrared (IR) wavelengths. The ambient color sensor 210 is configured to perform measurements of light received through the ambient light sensor ink that, across a wide range of lighting intensities, allows accurate color estimation to be performed.

Figure 3F:
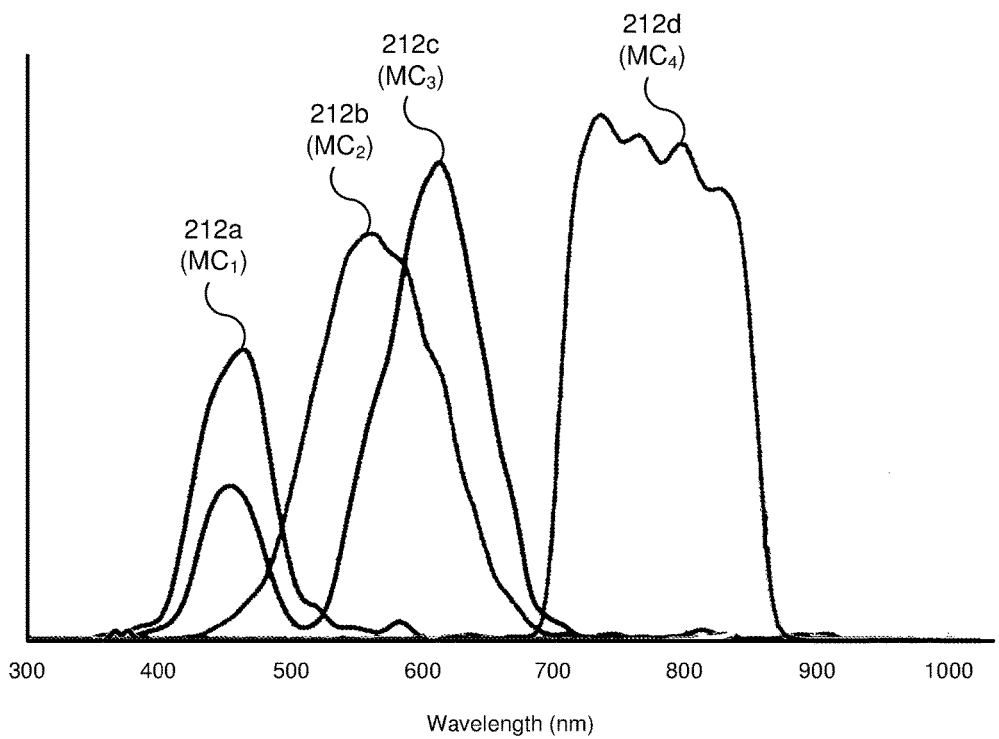
FIG. 3F illustrates an example of spectral response curves for the four light detectors included in the ambient color sensor in FIG. 2.

FIG. 3F illustrates an example of spectral response profiles for the four light detectors 212a, 212b, 212c, and 212d included in the ambient color sensor 210 in FIG. 2. The light detectors 212 have substantially different responses to received light intensity at various wavelengths, which may be due to, at least in part, substantially different spectral transmission profiles for the color filters 216. The light detector 212a (providing a color measurement component labeled "$MC_1$") is most responsive to blue wavelengths. The light detector 212b (providing a color measurement component labeled "$MC_2$") is most responsive to green and yellow wavelengths, and has an overlapping spectral response with the light detector 212a. The light detector 212c (providing a color measurement component labeled "$MC_3$") is most responsive to red and orange wavelengths, and has an overlapping spectral response with the light detectors 212a and 212b. The light detector 212d (providing a color measurement component labeled "$MC_4$") is most responsive to infrared wavelengths. It is noted that the term "color measurement component" is not limited to a value directly reported by an ambient color sensor, but also a derived indication of measured light intensity; for example, offset, scaling, or other transformations of an initial value received from an ambient color sensor that provides an indication of measured light intensity. This also includes, for example, an average of values obtained from multiple measurements. For purposes of this discussion, the term "average" includes, but is not limited to, an arithmetic mean (for which there are various algorithms), a median, or a mode, and may also include selectively excluding outlier values from a calculation of the average.

The ambient light 150 measured by each of the light detectors 212 passes through an "optical stack" of materials: the cover layer 220, optical ink 240, light redirecting structure 250, and color filters 216, each of which may be affected by manufacturing variations resulting in individual variations in spectral transmission to the light detectors 212 for each installed ambient color sensor 210 through its respective optical stack. In addition, manufacturing variations may also affect active semiconductor elements of the ambient color sensor 210 (for example, light detectors 212 and/or analog to digital converters (ADCs)), resulting in variations in spectral sensitivity, gain, and/or offset. A sensor specific calibration is useful for improving the accuracy of color values despite such variations in performance.

Figure 4:
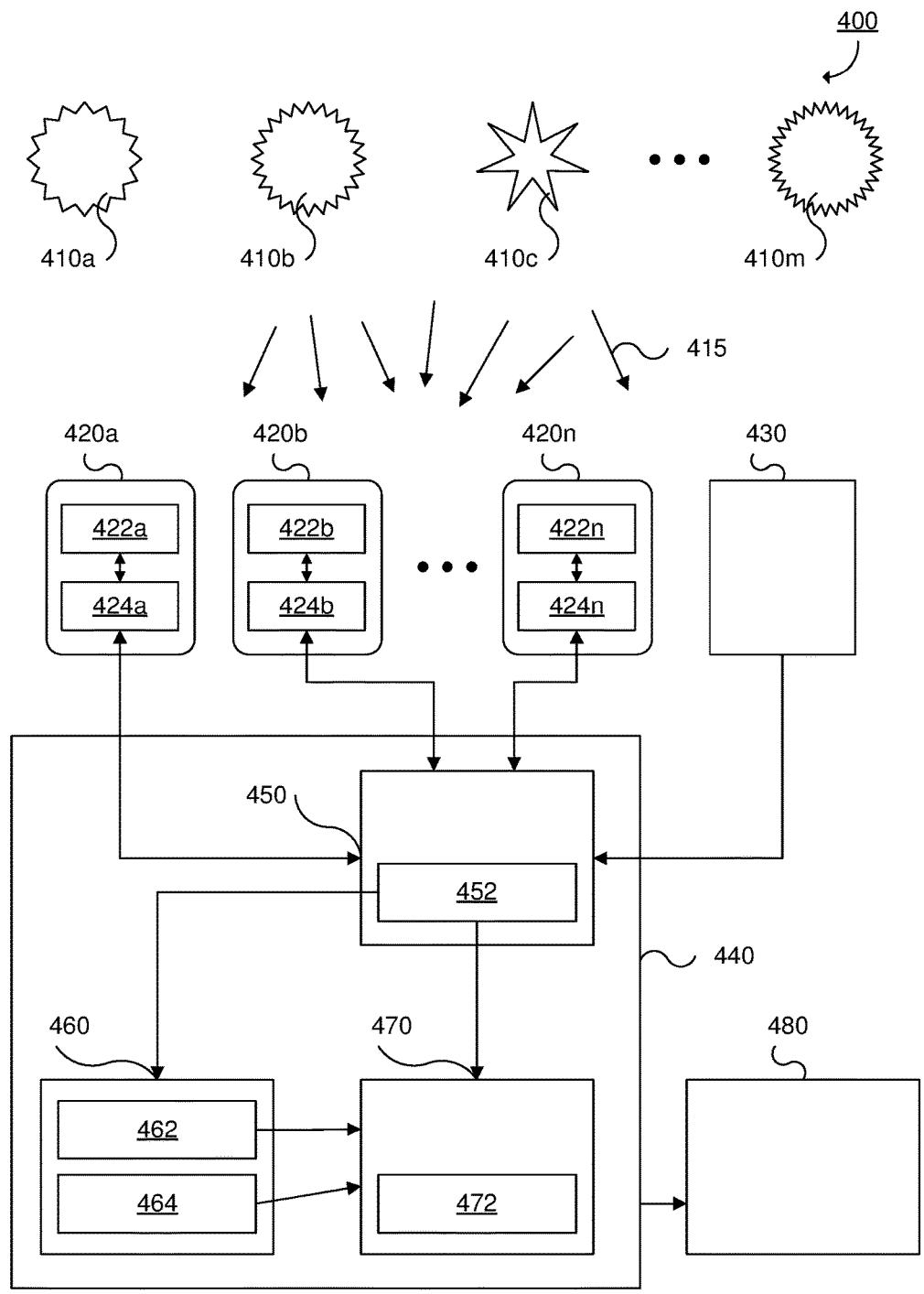
FIG. 4 illustrates an example of an ambient lighting characterization system adapted to characterize responses of ambient color sensors to various ambient lighting scenarios.

FIG. 4 illustrates an example of an ambient lighting characterization system 400 (which may be referred to as characterization system 400) adapted to characterize responses of ambient color sensors to various ambient lighting scenarios. The characterization system 400 includes a plurality of light sources 410a-410m (which may be collectively referred to as light sources 410) providing various spectral emission profiles such as, but not limited to, the spectral emission profiles illustrated in FIGS. 3A-3D. A light source refers to one or more light emitting components, which may each include multiple discrete light emitting elements, with substantially similar spectral emission profiles. Additionally, the light sources 410 may exhibit a range of color temperatures and light emitting technologies (such as, but not limited to, incandescent, halogen, fluorescent, CFL, and LED). Each of the light sources 410 is configured to be selectively enabled or disabled to provide ambient light 415, and combinations of the light sources 410 may be enabled concurrently to produce ambient light 415 presenting mixed lighting conditions. In some examples, a portion of the light sources 410 are configured to perform dimming to a selected degree. Selective enabling/disabling and/or dimming of the light sources 410 may be performed under control of a measurement collection module 450, which is described in further detail below.

The characterization system 400 includes a plurality of reference sensor devices 420a-420n (which may be collectively referred to as reference sensor devices 420 or reference devices 420) including a respective ambient color sensor 422a-422n (which may be collectively referred to as ambient color sensors 422 or reference sensors 422), which may include the various features described for the ambient color sensor 210 in FIG. 2. Each of the reference sensor devices 420a-420n also includes a respective measurement control module 424a-424n configured to receive commands from the measurement collection module 450, control one or more respective ambient color sensors 422 included in the reference sensor device 420 according to the received commands (including, for example, setting operating parameters and/or initiating measurement operations), obtain sensor signals from the respective ambient color sensor 422a-422n, and provide the sensor signals to the measurement collection module 450. The reference sensor devices 420 are constructed with an optical stack as described in FIG. 2, with the optical stack and ambient color sensors 422 being representative of those used in electronic devices used by end users, such as the electronic device 100 described in FIGS. 1 and 2. However, the reference sensor devices 420 may be prototype or incomplete devices not including all of the components or features provided in end user electronic devices.

The characterization system 400 may also include a reference spectrometer 430 used to perform accurate calibrated color measurements of ambient light 415. For example, the reference spectrometer 430 may be configured to provide calibrated color measurements as CIE 1931 XYZ tristimulus values. The measurement collector 450 may be configured to automatically receive calibrated color measurements of ambient light 415 from the reference spectrometer 430.

The characterization system 400 includes a sensor analysis system 440, which includes the measurement collection module 450. The measurement collection module 450 is configured to collect reference color measurements from the reference sensor devices 420 for each of the reference sensors 422 for each of a plurality of selected ambient lighting scenarios presenting different spectral emission profiles. As mentioned previously, in some implementations the measurement collection module 450 is configured to automatically control and configure the light sources 410 to selectively enable/disable and/or dim individual light sources 410 to present each of the plurality of ambient lighting scenarios. In some examples, the measurement collection module 450 is configured to automatically control and configure dimming of individual light sources 410 to present ambient lighting scenarios with various illuminances. Each different illuminance (or lux level) used for an ambient lighting scenario with a given color temperature may be referred to as an ambient lighting condition. In some examples in which the measurement collection module 450 receives calibrated color measurements of ambient light 415 from the reference spectrometer 430, the measurement collection module 450 may be configured to control dimming of one or more light sources 410; for example, to achieve a selected illuminance. Additionally, in some examples one or more of the plurality of ambient lighting scenarios is achieved with two or more of the light sources 410 concurrently enabled, to present and obtain reference color measurements for mixed lighting conditions, as such mixed lighting conditions may be encountered by end users.

The measurement collection module 450 collects one or more reference color measurements from each of the reference sensors 422 for each of the plurality of selected ambient lighting scenarios at one or more selected illuminances. In some examples, for each selected ambient lighting condition, multiple reference color measurements may be obtained from a reference sensor 422, with the reference sensor 422 positioned in a different orientation for each reference color measurement, in order to also measure and characterize off-axis responses of the reference sensors 422. The measurement collection module 450 is also configured to collect calibrated color measurements from the reference spectrometer 430 for each selected ambient lighting condition. The measurement collection module 450 is configured to store the reference color measurements obtained for the reference sensors 422 and the calibrated color measurements from the reference spectrometer 430, as well as to provide the stored reference color measurements 452 (which may be referred to as "stored color measurements") in response to requests from other modules and/or systems. In some examples, each reference sensor 422 is configured to use a same predetermined gain level and/or a predetermined integration time for collecting reference color measurements.

Figure 5A:
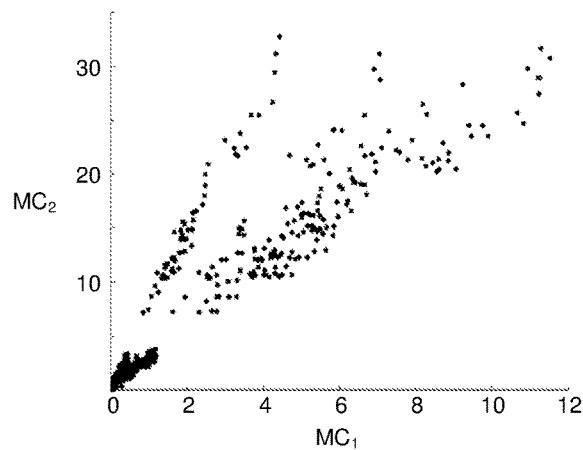
FIGS. 5A-5C illustrate an example of color measurements collected by the measurement collection module in FIG. 4.
Figure 5B:
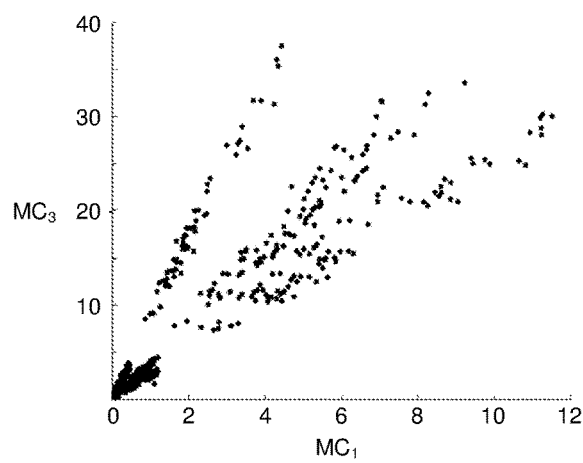
Figure 5C:
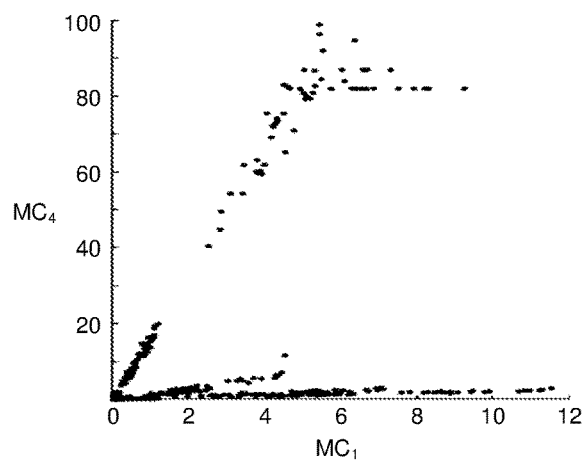

FIGS. 5A-5C illustrate an example of reference color measurements collected by the measurement collection module 450 in FIG. 4. In this example, reference color measurements were collected for eight ambient lighting scenarios, each using one of eight light sources 410: a 40 W halogen light, a 45 W incandescent light, a 2700K "warm white" CFL, a 4100K "natural white" fluorescent light, a 6500K "daylight" fluorescent light, a 3000K "warm white" LED, a 5000K "cold white" LED, and a 6500K "daylight" LED. Each of the eight light sources 410 were operated, with only one light source 410 enabled at a time, at four different illuminances: about 500 lux, about 1000 lux, about 5000 lux, and about 7000-10000 lux (with some light sources having a maximum illuminance below 10000 lux). Thus, a total of 32 different ambient lighting conditions were used for collecting reference color measurements for the eight ambient lighting scenarios. Reference color measurements were collected from 14 reference sensors 422 for each of the 32 ambient lighting conditions, yielding 448 reference color measurements. For each reference color measurement, a four-dimensional reference color measurement was obtained that included the $MC_1$, $MC_2$, $MC_3$, and $MC_4$ color measurement components described in FIG. 3F. The color measurement components for these reference color measurements are plotted in FIGS. 5A-5C along various axes: in FIG. 5A, $MC_2$ values are shown in relation to $MC_1$ values; in FIG. 5B, $MC_3$ values are shown in relation to $MC_1$ values; and in FIG. 5C, $MC_4$ values are shown in relation to $MC_1$ values.

Returning to the discussion of FIG. 4, the characterization system 400 includes an ambient lighting clustering module 460 that is configured to automatically analyze the stored reference color measurements 452 to identify a plurality of clusters of reference color measurements (which may be referred to as ambient lighting clusters, lighting clusters, or groups). Various techniques are known and may be applied for performing automated clustering, including, but not limited to k-means, Gaussian mixture model, k-medoid/PAM clustering, or unsupervised training techniques and algorithms, and variations thereof. In some examples, rather than only selecting from the color measurement components provided by the reference sensors 422 as dimensions for color measurement coordinates used to identify lighting clusters, one or more ratios are calculated using the color measurement component that is the most responsive to the shortest visible wavelengths ($MC_1$ in the examples illustrated in FIGS. 2 and 3F) as the divisor for the ratios, and the one or more ratios are included as dimensions for the color measurement coordinates used to identify lighting clusters. In the examples illustrated in FIGS. 2 and 3F, with four color measurement components $MC_1$, $MC_2$, $MC_3$, and $MC_4$, three candidate ratios are available: $MC_2/MC_1$, $MC_3/MC_1$, and $MC_4/MC_1$. In some examples, other arithmetic combinations of the color measurement components may be used as dimensions for color measurement coordinates used to identify lighting clusters. In some examples, a multi-step clustering may be performed, in which a first clustering based on a first set of dimensions identifies first and second lighting clusters for the stored reference color measurements 452, and a second clustering based on a different second set of dimensions identifies third and fourth lighting clusters for the stored reference color measurements 452 included in the second cluster. Such multi-step clustering may result in lighting clusters giving more accurate estimated color values over a single-step clustering with additional dimensions. Various techniques are known, and may be applied, to determine an effective number of clusters that does not overfit the stored reference color measurements 452; for example, silhouette analysis may be used with k-means to evaluate and/or compare clusters produced for selected numbers of clusters. The ambient lighting clustering module 460 is configured to store cluster parameters for the identified lighting clusters, as well as provide the stored cluster parameters 462 in response to requests from other modules and/or systems. As an example, a cluster centroid may be stored as cluster parameters for a cluster identified using k-means clustering. The stored cluster parameters are effective for automatically identifying one of the identified lighting clusters as being associated with a reference color measurement, such as a new color measurement not originally used to identify the lighting clusters.

In some implementations, each of the ambient lighting scenarios (for example, an ambient lighting scenario in which a single light source 410 is enabled) is associated with a lighting cluster, resulting in each lighting cluster being associated with a lighting cluster of one or more of the ambient lighting scenarios. In some examples, an ambient lighting scenario is associated with the lighting cluster containing the greatest number of stored reference color measurements 452 for the ambient lighting scenario. In some examples, where the stored reference color measurements 452 for an ambient lighting scenario are across multiple lighting clusters, a stored reference color measurement 452 may be removed from a first lighting cluster and/or added to a second lighting cluster (for example, where the second cluster initially contains the greatest number of the stored reference color measurements 452 for the ambient lighting scenario). In response to a stored reference color measurement 452 being added to or removed from a lighting cluster, cluster parameters (including stored cluster parameters 462) for the lighting cluster may be accordingly updated; for example, a cluster centroid may be recalculated. The ambient lighting clustering module 460 may be configured to store the determined lighting clusters, as well as provide the stored lighting clusters 464 in response to requests from other modules and/or systems.

Figure 5D:
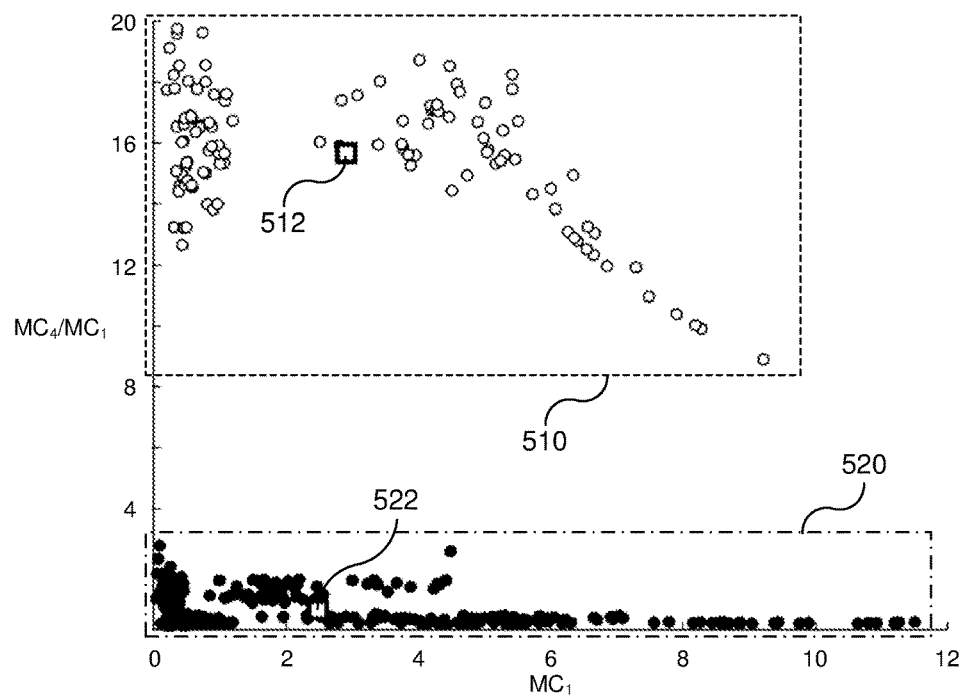
FIGS. 5D and 5E illustrate results of an automated clustering of the color measurements described and illustrated in FIGS. 5A-5C, in accordance with clustering techniques described herein.
Figure 5E:
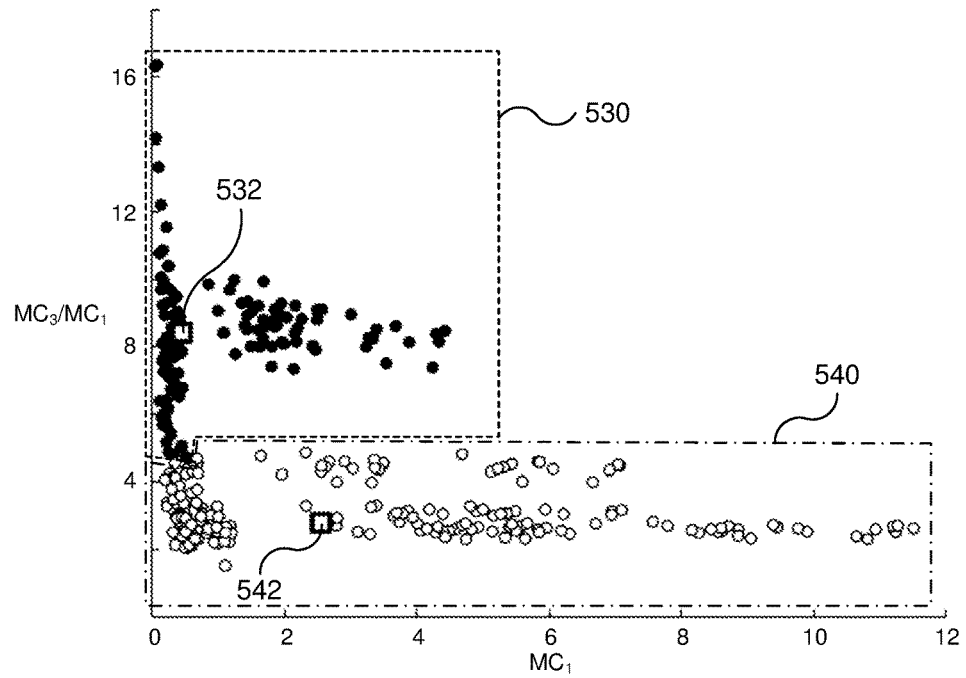

FIGS. 5D and 5E illustrate results of an automated clustering of the reference color measurements described and illustrated in FIGS. 5A-5C, in accordance with the clustering techniques described above. In FIGS. 5D and 5E, a multi-step clustering, involving first and second automated clustering operations, is performed. FIG. 5D illustrates a result of the first automated clustering where for each reference color measurement, a ratio of the $MC_4$ and $MC_1$ color measurement components (labeled "$MC_4/MC_1$") and the $MC_1$ color measurement component are used as the dimensions for clustering. In this example, the first automated clustering is performed using a k-means clustering algorithm dividing the measurement data into two lighting clusters: a first lighting cluster 510 with a first cluster centroid 512 and a second lighting cluster 520 with a second cluster centroid 522. FIG. 5E illustrates a result of the second automated clustering where for each reference color measurement in the second lighting cluster 520 (and not including reference color measurements in the first lighting cluster 510), a ratio of the $MC_3$ and $MC_1$ color measurement components (labeled "$MC_3/MC_1$") and the $MC_1$ color measurement component are used as the dimensions for clustering. In this example, the second automated clustering was performed using a k-means clustering algorithm whereby the reference color measurements in the second lighting cluster 520 were divided into two lighting clusters (which may also be referred to as subclusters): a third lighting cluster 530 with a third cluster centroid 532 and a fourth lighting cluster 540 with a fourth cluster centroid 542. The first lighting cluster 510 corresponds to a first lighting cluster (including the 40 W halogen light and the 45 W incandescent light ambient lighting scenarios), the third lighting cluster 530 corresponds to a second lighting cluster (including the "warm white" CFL and the 2700K "warm white" CFL ambient lighting scenarios), and the fourth lighting cluster corresponds to a third lighting cluster (including the "natural white" fluorescent light, the "daylight" fluorescent light, the "cold white" LED, and the "daylight" LED ambient lighting scenarios). Each of the clusters 510, 520, 530, and 540 may be represented by its respective centroid 512, 522, 532, and 542. In this example, the $MC_2$ color measurement component is not used, even for generating a ratio, to identify lighting clusters for reference color measurements, although the $MC_2$ color measurement component is used to calculate estimated calibrated color values.

Returning to the discussion of FIG. 4, the characterization system 400 includes a lighting cluster transformation generator 470 configured to calculate, for each lighting cluster and/or lighting cluster identified by the ambient lighting clustering module 460, a respective set of generic per-cluster transformation parameters (which may simply be referred to as "transformation parameters" or "cluster transformation parameters") for a transformation function from color measurement components obtained from an ambient color sensor to a calibrated color value. The generic per-cluster transformation parameters are "generic" due to the parameters not accounting for sensor-specific variations in performance between different sensors. However, the generic per-cluster transformation parameters are generally effective for providing calibrated color values for the reference sensors 422 and similar ambient color sensors, such as the ambient color sensor 210 in FIG. 2. The lighting cluster transformation generator 470 is be configured to store the generic per-cluster transformation parameters, as well as provide the stored generic per-cluster transformation parameters 472 in response to requests from other modules and/or systems.

In some implementations, the generic per-cluster transformation parameters are coefficients for calculating calibrated color components as linear combinations of the color measurement components. For such a transformation, the four measurement components $MC_1$, $MC_2$, $MC_3$, and $MC_4$ of a reference color measurement may be arranged in a column as a 4×1 matrix M, the generic per-cluster transformation parameters arranged in a 3×4 generic per-cluster parameter matrix $P_{cluster}$, and the matrices M and $P_{cluster}$ multiplied to yield the calibrated color value (for example, as CIE 1931 XYZ tristimulus values) in a column as a 3×1 matrix $C_{calib}$, according to equation 1.

$$C_{calib} = P_{cluster} \cdot M \quad (1)$$

Various approaches may be used to calculate the generic per-cluster parameter matrix $P_{cluster}$ for a lighting cluster. In a first approach, for each ambient lighting scenario associated with the assigned lighting cluster, a corresponding lighting scenario parameter matrix $P_{scenario}$, having the same dimensions as the above parameter matrix $P_{cluster}$ (3×4, in this example) is calculated, which can be applied in the same manner as the parameter matrix $P_{cluster}$ to produce calibrated color values from color measurement component values. The lighting scenario parameter matrix $P_{scenario}$ may be calculated according to equation 2.

$$P_{scenario} = C_{ref} M_{scenario}^{+} \quad (2)$$

$C_{ref}$ is a 3×k matrix, where k is the number of stored reference color measurements 452 for the ambient lighting scenario and each column of $C_{ref}$ contains a set of tristimulus values provided by the reference spectrometer 430 for the ambient lighting conditions used for a respective one of the k stored reference color measurements 452 for the ambient lighting scenario. $M_{scenario}^{+}$ is a k×4 pseudoinverse matrix (for example, a Moore-Penrose pseudoinverse), or a similar matrix, of a 4×k matrix $M_{scenario}$, in which each column of $M_{scenario}$ contains a set of four color measurement components $MC_1$, $MC_2$, $MC_3$, and $MC_4$ for a respective one of the k stored color measurements 452 for the ambient lighting scenario. The pseudoinverse provides the best linear approximation, in terms of least squares error, to the actual solution. In some examples, the generation of $M_{scenario}$, $M_{scenario}^{+}$, and/or $P_{scenario}$ may apply weightings to various color measurements to better reflect their expected importance. In some implementations, k is instead the number of stored reference color measurements 452 for the ambient lighting scenario at a reference illuminance used for all of the ambient lighting scenarios (for example, 5000 lux), and the columns of $C_{ref}$ and $M_{scenario}$ correspond to those stored reference color measurements 452. The lighting cluster transformation generator 470 may be configured to store the lighting scenario parameter matrix $P_{scenario}$ calculated for each of ambient lighting scenario. Where the lighting cluster has only one ambient lighting scenario in its associated lighting cluster, the generic per-cluster parameter matrix $P_{cluster}$ for the lighting cluster is simply the lighting scenario parameter matrix $P_{scenario}$. Where the lighting cluster has two or more ambient lighting scenarios in its associated lighting cluster, the generic per-cluster parameter matrix $P_{cluster}$ for the lighting cluster may be calculated by a mathematic combination of the lighting scenario parameter matrices $P_{scenario}$ calculated for each of the ambient lighting scenarios. For example, each element of the generic per-cluster parameter matrix $P_{cluster}$ may be calculated by taking the median of the corresponding elements in the lighting scenario parameter matrices $P_{scenario}$. In some examples, the mathematic combination may apply weightings to various ambient lighting scenarios to better reflect their expected importance in end usage situations.

In a second approach, similar operations are performed, but the generic per-cluster parameter matrix $P_{cluster}$ is calculated more directly according to equation 3.

$$P_{cluster} = C_{ref} M_{cluster}^{+} \quad (3)$$

$C_{ref}$ is a 3×j matrix, where j is the number of stored reference color measurements 452 for the lighting cluster and each column of $C_{ref}$ contains a set of tristimulus values provided by the reference spectrometer 430 for the ambient lighting conditions used for a respective one of the j stored reference color measurements 452 for the lighting cluster. $M_{cluster}^{+}$ is a j×4 pseudoinverse matrix, or a similar matrix, of a 4×j matrix $M_{cluster}$, in which each column of $M_{cluster}$ contains a set of four color measurement components $MC_1$, $MC_2$, $MC_3$, and $MC_4$ for a respective one of the j stored reference color measurements 452 for the lighting cluster. In some implementations, j is instead the number of stored reference color measurements 452 for the lighting cluster at a reference illuminance (for example, 5000 lux) used for all of the ambient lighting scenarios associated with the lighting cluster, and the columns of $C_{ref}$ and $M_{cluster}$ correspond to those stored reference color measurements 452. In some examples, the generation of $M_{cluster}$, $M_{cluster}^{+}$, and/or $P_{cluster}$ may apply weightings to various reference color measurements to better reflect their expected importance in end usage situations.

It is noted that the transformation function is not limited to the above linear combinations. The transformation function may include one or more of a lookup table (with or without interpolation), an algorithm trained with unsupervised training techniques, and a function that is responsive to one or more past reference color measurements and/or calibrated color values.

In some implementations, the characterization system 400 is configured to automatically perform an iterative process in which the ambient lighting clustering module 460 automatically identifies a selected number of lighting clusters, the lighting cluster transformation generator 470 calculates generic per-cluster transformation parameters for each of the identified lighting clusters, the generic per-cluster transformation parameters are applied to associated stored reference color measurements 452 to estimate calibrated color values, and an error calculated (for example, a mean squared error) between the estimated calibrated color values and corresponding color values obtained from the reference spectrometer 430. An appropriate number of lighting clusters may be identified by a number of lighting clusters after which a rate of reduction in the error decreases significantly.

FIG. 4 also illustrates an external system 480 that is configured to obtain various measurement-, cluster-, and transformation parameter-related information from characterization system 440 for use by the external system 480. For example, the external system 480 may obtain stored reference color measurements 452, stored cluster parameters 462, stored lighting clusters 464, and/or stored generic per-cluster transformation parameters 472 from characterization system 440.

Figure 6:
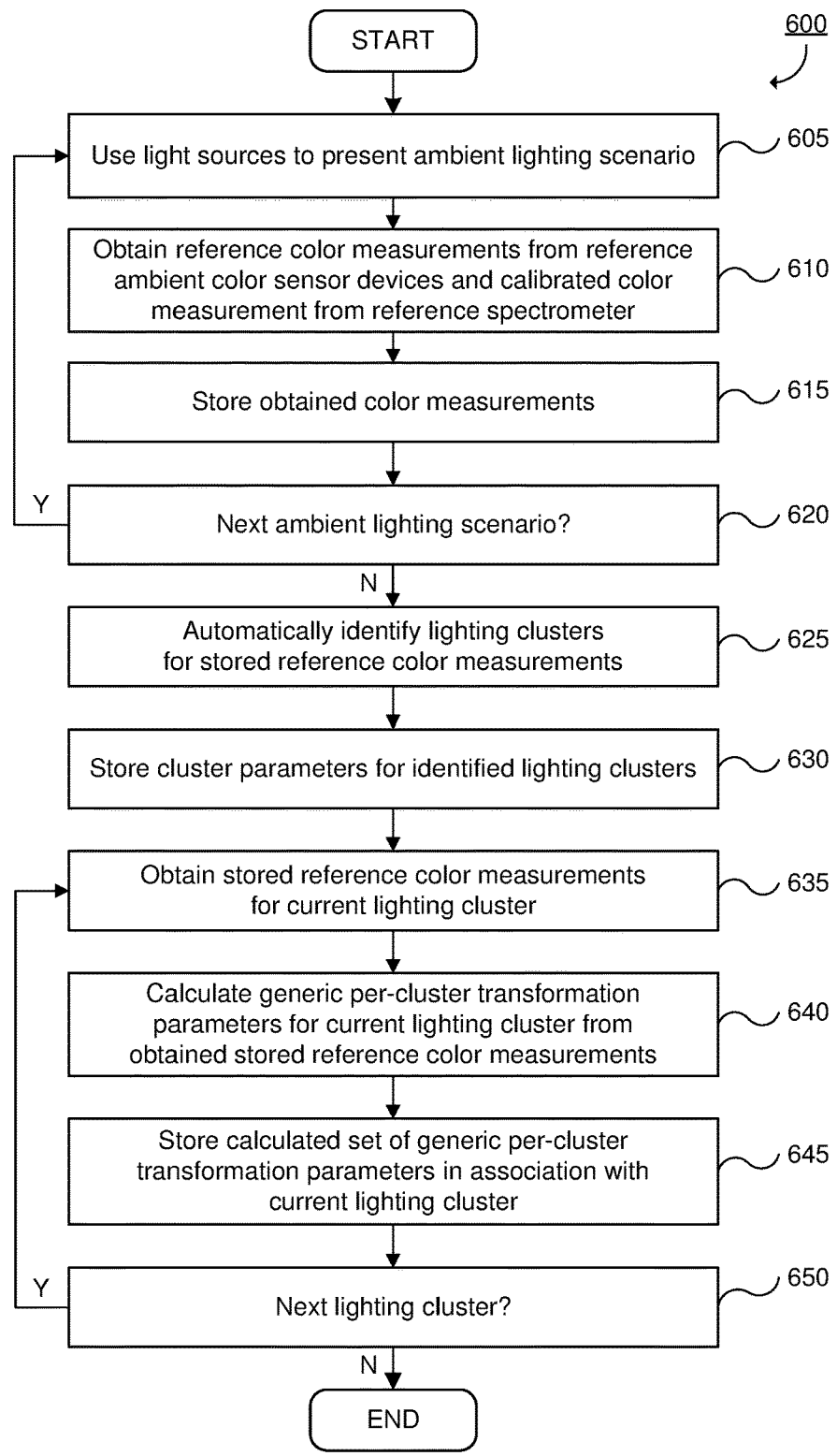
FIG. 6 illustrates an example process for use of the characterization system in FIG. 4.

FIG. 6 illustrates an example process 600 for use of the characterization system 400 in FIG. 4, applying the various techniques described above. It is noted that other processes, or variations of the process 600, may instead be applied. At 605, one or more light sources 410 are used to present a current ambient lighting scenario to the reference sensor devices 420. At 610, reference color measurements are obtained from each of the reference sensor devices 420 while exposed to the current ambient lighting scenario and, in some examples, also a calibrated color value is obtained from a reference spectrometer 430 while also exposed to the current ambient lighting scenario. This may be performed with the current ambient lighting scenario being presented at different illuminances and corresponding reference color measurements also obtained. At 615, the obtained reference color measurements are stored for later processing. At 620, if there is another ambient lighting scenario for which reference color measurements are to be obtained, steps 605-615 are repeated for the next ambient lighting scenario. At 625, the characterization system 400 automatically identifies lighting clusters for the stored reference color measurements. At 630, the characterization system 400 stores cluster parameters for the identified lighting clusters identified in operation 625 for later use. At 635, stored reference color measurements are obtained for a current lighting cluster. This may selectively exclude some of the reference color measurements stored for the lighting cluster, such as reference color measurements obtained from reference sensor devices 420 determined to be outliers. At 640, the characterization system 400 calculates generic per-cluster transformation parameters for the current lighting cluster based on the reference color measurements obtained at 635. At 640, the calculated generic per-cluster transformation parameters are stored in association with the current lighting cluster. At 650, if there is another lighting cluster, steps 635-645 are repeated for the next lighting cluster.

Figure 7:
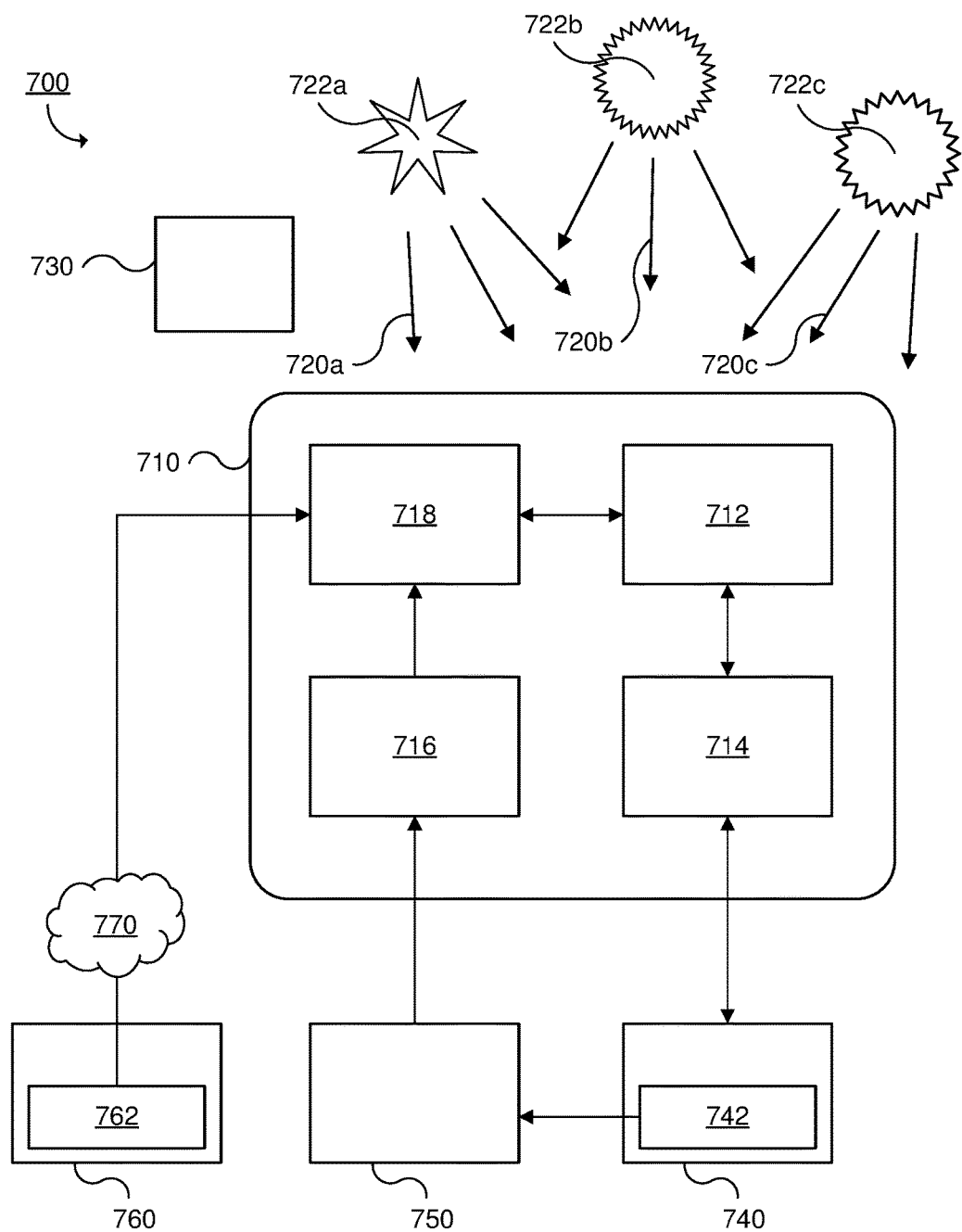
FIG. 7 illustrates an example of a sensor calibration system configured to perform a per-sensor calibration for use in combination with the generic per-cluster transformation parameters produced by the ambient lighting characterization system in FIG. 4.

FIG. 7 illustrates an example of a sensor calibration system 700 configured to perform a per-sensor calibration for use in combination with the generic per-cluster transformation parameters produced by the ambient lighting characterization system 400 in FIG. 4. In FIG. 7, an electronic device 710, which may include various elements and features described for the electronic device 100 in FIGS. 1 and 2, is being used in combination with the sensor calibration system 700 to calculate a per-sensor calibration for an ambient color sensor 712 included in the electronic device 700. This calibration may be performed as part of a manufacturing process for the electronic device 100. Preferably an optical stack for the ambient color sensor 712 is substantially the same as the optical stacks for the reference sensors 422 used to collect color measurements for generating generic per-cluster transformation parameters used for the ambient color sensor 712, and active semiconductor elements of the ambient color sensor 712 have substantially similar spectral responses to their counterparts in the reference sensors 422.

The electronic device 710 also includes a measurement control module 714, with may operate and include features much as described for measurement control modules 424 in FIG. 4. The measurement control module 714 is configured to receive commands from a correction parameter calculation module 740 included in sensor calibration system 700 (although in some implementations, some or all of the correction parameter calculation module 740 may be included in the electronic device 710), control the ambient color sensor 712 according to the received commands (including, for example, setting operating parameters and/or initiating measurement operations), obtain sensor signals from the ambient color sensor 712, and provide the sensor signals to the correction parameter calculation module 740.

The sensor calibration system 700 includes one or more calibration light sources 722a, 722b, and 722c (also referred to as representative light sources, and collectively referred to as calibration light sources 722) that are selectively operated to produce respective first calibration ambient lighting 720a, second calibration ambient lighting 720b, and third calibration ambient lighting 720c (more generally referred to as calibration ambient lighting 720), each with a predetermined reference illuminance at the electronic device 710; for example, an illuminance that is substantially similar to the reference illuminance described in FIG. 4. The first calibration ambient lighting 720a corresponds to a first lighting cluster included in the lighting clusters identified by the characterization system 400, such as the first lighting cluster 510 in FIG. 5D. The second calibration ambient lighting 720b corresponds to a second lighting cluster included in the lighting clusters identified by the characterization system 400, such as the third lighting cluster 530 in FIG. 5E. The third calibration ambient lighting 720c corresponds to a third lighting cluster included in the lighting clusters identified by the characterization system 400, such as the fourth lighting cluster 540 in FIG. 5E. In some examples, the calibration ambient lighting 720 is substantially similar to an ambient lighting scenario used to calculate the stored generic per-cluster transformation parameters 472.

In some implementations, the number of different calibration ambient lighting 720 is equal to the number of lighting clusters. In some implementations, the calibration light sources 722 are selectively enabled and disabled to produce the various calibration ambient lighting 720). In other implementations, the calibration light sources 722 are continuously operated, allowing them to reach stable operating conditions, and the electronic device 710 is moved from one calibration light source 722 to another for calibrating the electronic device 710. In some examples, the sensor calibration system 700 may include a reference spectrometer 730, which allows periodic confirmation that the calibration ambient lighting 720 presents the desired spectral emission and illuminance.

The correction parameter calculator 740 is configured to collect one or more color measurements from the electronic device 710 indicating a response of the ambient color sensor 712 to a calibration ambient lighting 720 that the ambient color sensor 712 is exposed to, resulting in a sensed color measurement (which may be, for example, an average of multiple color measurements received from the electronic device 710 while exposed to a same calibration ambient lighting 720). In some examples, one or more scale factors may be applied to the sensed color measurement to compensate for differences in integration time, amplifier gain, and/or amplifier performance between the ambient color sensor 712 and the reference sensors 422 used to collect the stored reference color measurements 452. Sensor-specific sensor correction parameters for the ambient color sensor 712 are calculated based on a comparison between the sensed color measurement and a first average reference color measurement. In some implementations, the first average reference color measurement is calculated as an average of a plurality of stored reference color measurements 452 (which may selectively exclude outlier values) for the first lighting cluster at the reference illuminance for a plurality of ambient lighting scenarios associated with the first lighting cluster. In other implementations, the calibration ambient lighting 720 is substantially similar to a first ambient lighting scenario used to calculate the stored generic per-cluster transformation parameters 472, and the first average reference color measurement is instead calculated as an average of a plurality of stored reference color measurements 452 (which may selectively exclude outlier values) for the first ambient lighting scenario at the reference illuminance. The first average reference color measurement may be calculated in advance.

In some implementations, sensor-specific sensor correction parameters are calculated by, for each color measurement component (for example, the four color measurement components $MC_1$, $MC_2$, $MC_3$, and $MC_4$), calculating a respective sensor-specific sensor correction parameter by dividing the average reference color measurement component by the corresponding sensed color measurement component. For example, sensor-specific sensor correction parameters $P_1$, $P_2$, $P_3$, and $P_4$ may be calculated from average reference color measurement components $R_1$, $R_2$, $R_3$, and $R_4$ and sensed color measurement components $S_1$, $S_2$, $S_3$, and $S_4$ according to equations 4-7.

$$P_1 = R_1/S_1 \quad (4)$$

$$P_2 = R_2/S_2 \quad (5)$$

$$P_3 = R_3/S_3 \quad (6)$$

$$P_4 = R_4/S_4 \quad (7)$$

In some implementations, the sensor calibration system 700 includes a calibration ambient lighting 720 for each of the lighting clusters identified by the characterization system 400, and different sensor-specific per-cluster sensor correction parameters are calculated for each lighting cluster. In some implementations, calibration ambient lighting 720 for only a portion of the lighting clusters are used by the sensor calibration system 700.

In some implementations, the sensor calibration system 700 is configured to automatically determine that the ambient color sensor 712 is not operating correctly based on one or more sensor-specific sensor correction parameters being outside of a first expected range and/or one or more sensed color measurement components being outside of a second expected range. For example, an expected range for a sensed color measurement component may be a specified percentage above and below a corresponding average reference color measurement component. In response to such a determination that the ambient color sensor 712 is not operating correctly, an indication that the ambient color sensor 712 is not operating correctly is transmitted to another system.

The correction parameter calculator 740 may be configured to store the sensor-specific sensor correction parameters in association with the ambient color sensor 712, as well as provide the stored sensor-specific sensor correction parameters 742 in response to requests from other modules and/or systems. The correction parameter calculator 740 may be configured to store the sensed color measurement(s) obtained for the ambient color sensor 712 in association with the ambient color sensor 712, to facilitate recalculating the stored sensor-specific sensor correction parameters 742 without involvement, such as new color measurements, of the electronic device 710.

The sensor calibration system 700 includes a calibration data delivery module 750, which is configured to provide the stored sensor-specific sensor correction parameters 742, the stored lighting cluster parameters 462, and the stored generic per-cluster transformation parameters 472 to the electronic device 710 for storage as sensor calibration data 716 (which may be referred to as calibration parameters) in the electronic device 710. In some implementations, the sensor calibration system 700 also includes an operating code delivery module 760, which is configured to provide program instructions 762 to the electronic device 710 (in some implementations, they may be provided via a network 770) for storage as operational program instructions 718 in the electronic device 710. When executed by the electronic device 710, the operational program instructions 718 configure the electronic device 710 to configure and control the ambient color sensor 712, and apply the stored sensor calibration data 716 to color measurements obtained from the ambient color sensor 712 to produce calibrated color values.

Although FIG. 7 only illustrates use of a single representative light source 722 for performing sensor-specific calibration for each lighting cluster, in other implementations, multiple representative light sources may be used to perform sensor-specific calibration for a lighting cluster.

Figure 8:
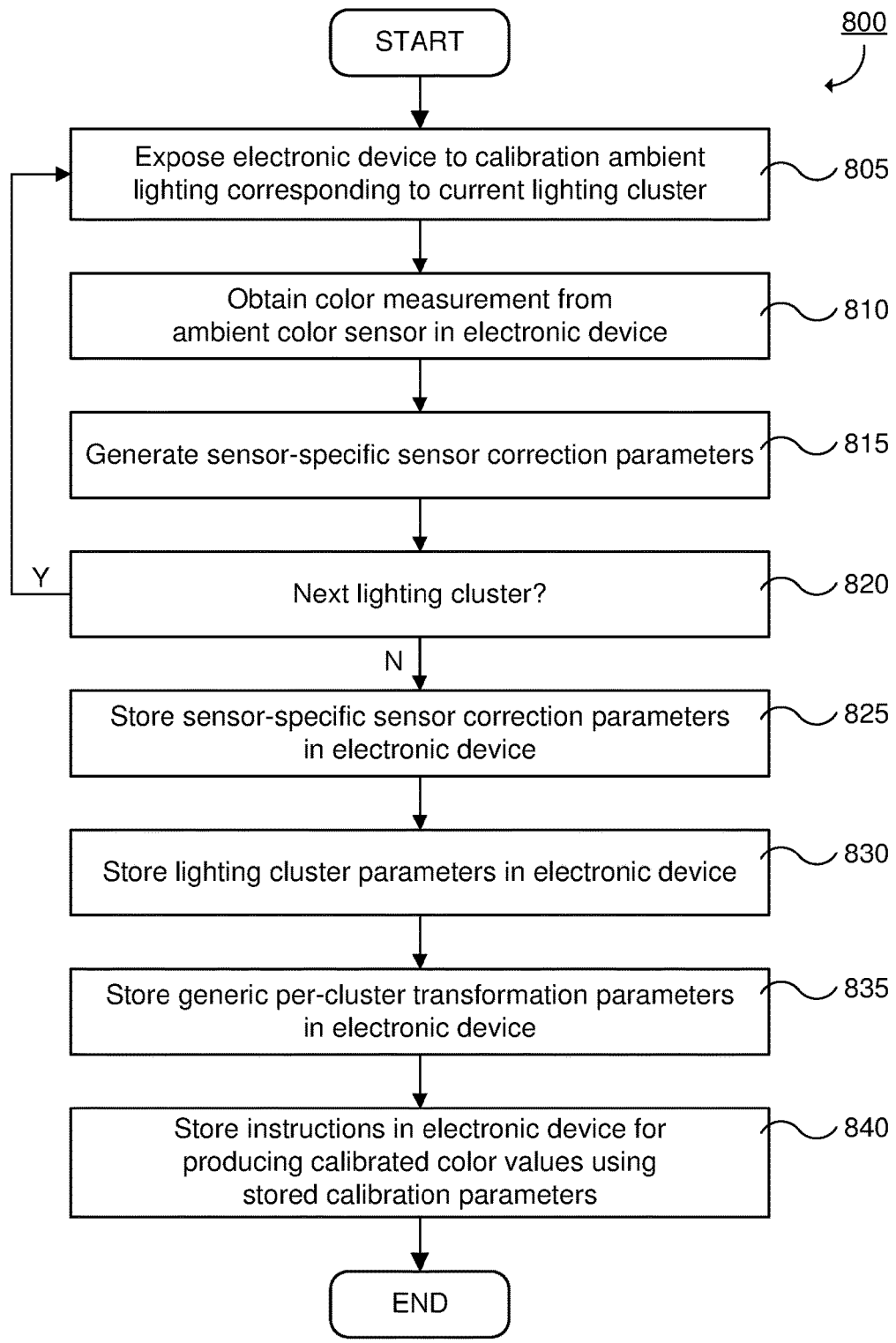
FIG. 8 illustrates an example process for use of the sensor calibration system in FIG. 7.

FIG. 8 illustrates an example process 800 for use of the sensor calibration system 700 in FIG. 7. applying the various techniques described above. It is noted that other processes, or variations of the process 800, may instead be applied. At 805, the electronic device 710 is exposed to calibration ambient lighting 720 corresponding to a current lighting cluster. At 810, a color measurement is obtained from the ambient color sensor 712 included in the electronic device 710. At 815, the electronic device 710 generates sensor-specific sensor correction parameters. In some implementations, the electronic device generates sensor-specific per-cluster sensor correction parameters for the current lighting cluster. At 820, if there is another lighting cluster, steps 805-815 are repeated for the next lighting cluster. At 825, the sensor-specific sensor correction parameters calculated at 815 are stored in the electronic device 710. In some implementations, sensor-specific per-cluster sensor correction parameters are stored in association with their respective lighting clusters. At 830, the cluster parameters for the identified lighting clusters, such as the cluster parameters stored in operation 630, are stored in the electronic device 710. At 835, the generic per-cluster transformation parameters calculated at 640 are stored in the electronic device 710. At 840, instructions are stored in the electronic device 710 for producing calibrated color values from color measurements obtained from the ambient color sensor 712, using the calibration parameters stored in the electronic device 710 at 825, 830, and 835.

In some implementations, the process 800 is modified from the above description to make use of only a single calibration ambient lighting, rather than a separate calibration ambient lighting for each of the lighting clusters. In such implementations, the operation 820 is omitted, and the instructions stored in operation 840 are configured to apply the sensor-specific sensor correction parameters generated in operation 815 and stored in operation 825 across all of the lighting clusters (for example, without regard to an identified lighting cluster used to select generic per-cluster transformation parameters). In some examples, the single calibration ambient lighting may not correspond to any of the identified lighting clusters. The techniques described in FIG. 7 may be modified accordingly. This allows a number of color measurement operations to be reduced and a resulting reduction in manufacturing time and complexity.

Figure 9:
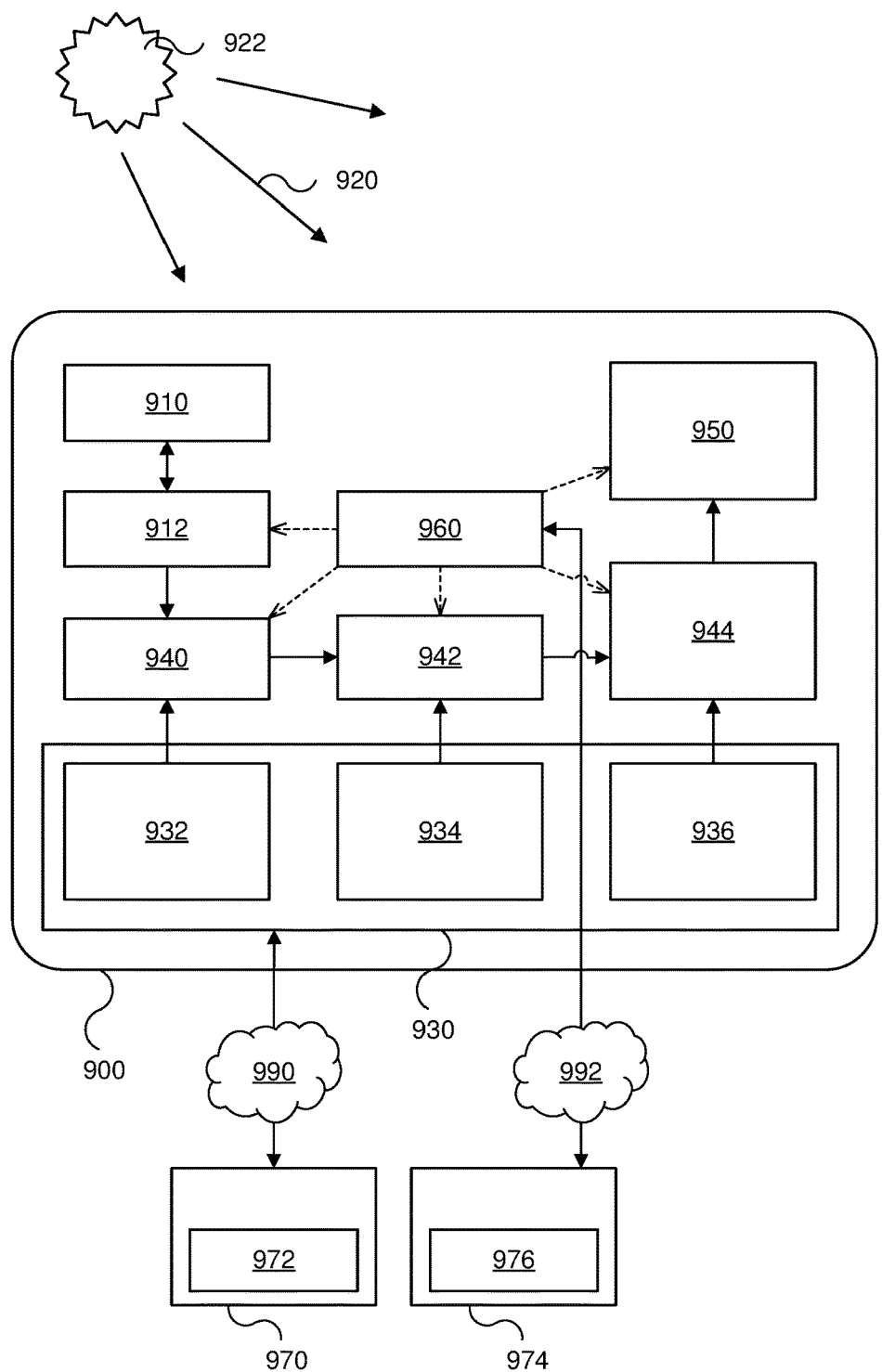
FIG. 9 illustrates an example of a calibrated electronic device in ordinary operation, for which a per-sensor calibration has been performed by the sensor calibration system in FIG. 7.

FIG. 9 illustrates an example of a calibrated electronic device 900 in ordinary operation, for which a per-sensor calibration has been performed by the sensor calibration system 700 in FIG. 7, much as described for electronic system 710. The calibrated electronic device 900 may operate and include various features as described for electronic devices 110 and 710. The calibrated electronic device 900 includes an ambient color sensor 910 that is substantially the same as the ambient color sensor 712. The calibrated electronic device 900 also includes a sensor control module 912 that is configured to control the ambient color sensor 910 (including, for example, setting operating parameters and/or initiating measurement operations), obtain color measurements for ambient light 920 (which may be produced, at least in part, by a light source 922) in a vicinity of the calibrated electronic device 900 from the ambient color sensor 910, and provide the color measurements to a correction parameter application module 940 included in the calibrated electronic device 900.

Much as described for the sensor calibration data 716 in FIG. 7, the calibrated electronic device 900 stores sensor calibration data 930, which includes cluster parameters 932 (such as the stored cluster parameters 462 in FIG. 4), sensor-specific sensor correction parameters 934 (such as the stored sensor-specific sensor correction parameters 742 in FIG. 7), and generic per-cluster transformation parameters 936 (such as the stored generic per-cluster transformation parameters stored in operation 835). Much as described in FIG. 7, the sensor calibration system 700 may provide the sensor calibration data 930 to be stored by the calibrated electronic device 900 during a factory sensor calibration procedure.

In some implementations, the calibrated electronic device 900 is configured to receive updates for the sensor calibration data 930 from a calibration data delivery system 970 via a network 990, such as the Internet. The calibration data delivery system 970 is configured to respond to requests for sensor calibration data and respond with items of sensor calibration data obtained from a calibration data storage 972. In addition to obtaining updated sensor calibration data, the calibrated electronic device 900 may also make use of the calibration data delivery system 970 to restore the sensor calibration data 930 in an event in which the sensor calibration data 930 is corrupted. In some examples, updates for the sensor calibration data 930 may instead be delivered as part of a software update including assets for other software features; for example, such software updates may be received from an operating code delivery system 974 configured to provide updates 976 to operational program instructions 960 for the calibrated electronic device 900.

The calibrated electronic device 900 includes a series of modules used to implement per-sensor calibration for color values obtained based on color measurements performed by the ambient color sensor 910, the modules including a cluster selection module 940, a correction parameter application module 942, and a generic transformation module 944. The cluster selection module 940 is configured to receive, via the sensor control module 912, a color measurement produced by the ambient color sensor 910, and select, based on the cluster parameters 932, a corresponding ambient lighting cluster. The selection process depends in part on the algorithm used to apply the cluster parameters 932; for example, for lighting clusters identified using k-means, identifying the lighting cluster corresponding to a color measurement involves identifying which of multiple cluster centroids has the shortest Euclidean distance to the color measurement.

The correction parameter application module 942 is configured to select the sensor-specific sensor correction parameters 934 that corresponds to the ambient lighting cluster, and to apply the selected sensor-specific sensor correction parameters 934 to the color measurement to get a corrected color measurement. For example, corrected color measurement components $C_1$, $C_2$, $C_3$, and $C_4$ would be calculated from measured color measurement components $M_1$, $M_2$, $M_3$, and $M_4$ and the sensor-specific sensor correction parameters $P_1$, $P_2$, $P_3$, and $P_4$ for the selected lighting cluster according to equations 8-11.

$$C_1 = M_1 \cdot P_1 \quad (8)$$

$$C_2 = M_2 \cdot P_2 \quad (9)$$

$$C_3 = M_3 \cdot P_3 \quad (10)$$

$$C_4 = M_4 \cdot P_4 \quad (11)$$

In some implementations, sensor-specific per-cluster sensor correction parameters 934 associated are selected based on an association with the lighting cluster selected by the cluster selection module 940.

The generic transformation module 944 is configured to obtain the generic per-cluster transformation parameters 936 corresponding to the lighting cluster selected by the cluster selection module 940, and applying the obtained generic per-cluster transformation parameters 936 to the corrected color measurement generated by the correction parameter application module 942 to obtain a calibrated color value (which may be in the form of CIE 1931 XYZ tristimulus values, for example). As an example, where a matrix-based approach for such calculations is employed, as described in FIG. 4, a calibrated tristimulus color value $C_{cal}$ is calculated (arranged as a 3×1 matrix) according to equation 12.

$$C_{cal} = P_{cluster} \cdot C_{corr} \quad (12)$$

$P_{cluster}$ is the 3×4 generic per-cluster parameter matrix described in FIG. 4 for the selected lighting cluster, and $C_{corr}$ is the corrected color measurement generated by the correction parameter application module 942 (arranged as a 4×1 matrix).

The calibrated electronic device 900 includes a color processing module 950, which is configured to receive the calibrated color value generated by the generic transformation module 944 and make use of the calibrated color value; for example, by adjusting a color cast for an image presented on a display device according to the calibrated color value. The calibrated electronic device 900 includes operational program instructions 960 which, when executed by the calibrated electronic device 900, cause the calibrated electronic device 900 to configure the calibrated electronic device 900 to implement the various modules 912, 940, 942, 944, and 950 described above.

Figure 10:
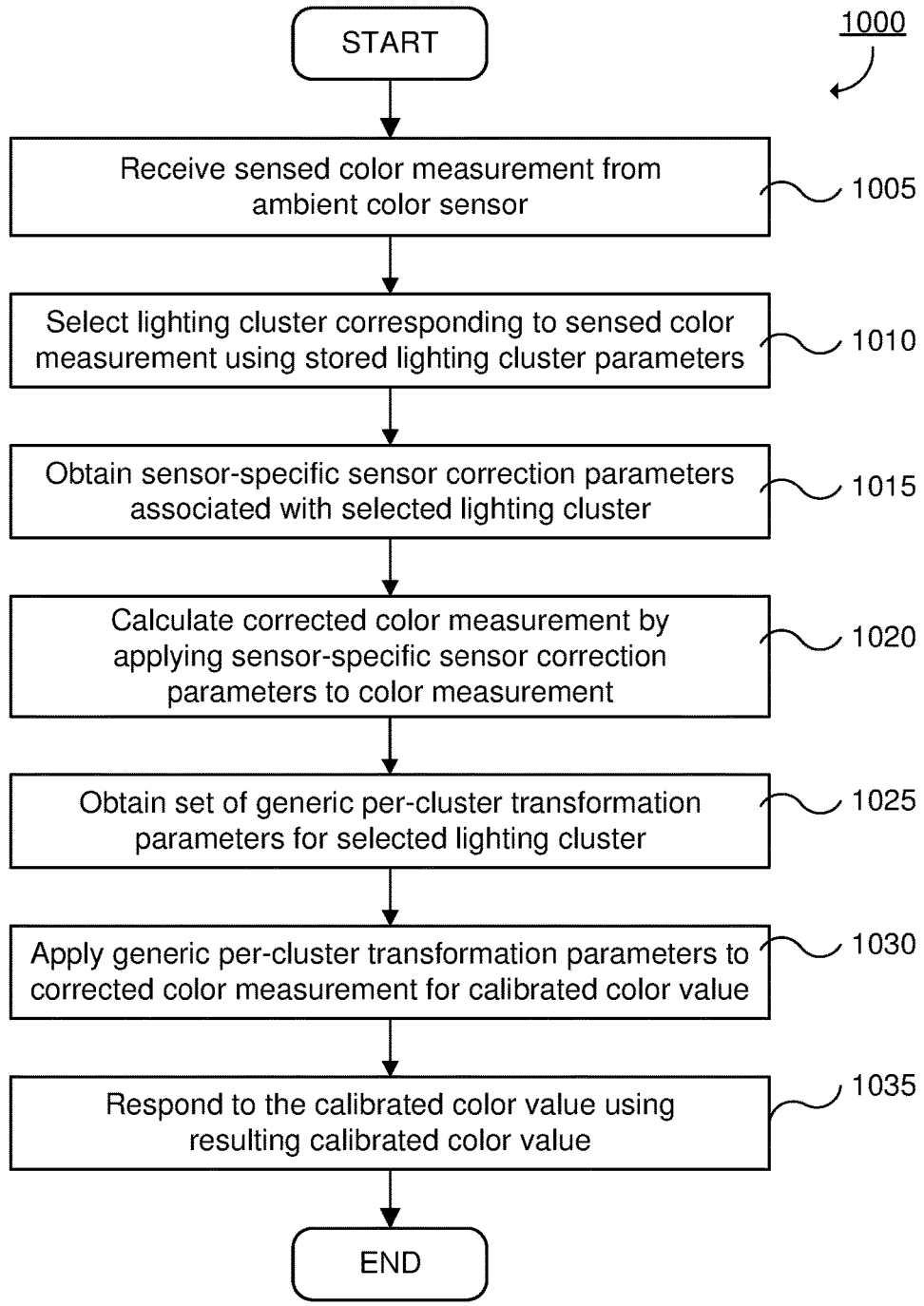
FIG. 10 illustrates an example process for generating calibrated color values with the calibrated electronic device in FIG. 9.

FIG. 10 illustrates an example process for generating calibrated color values with the calibrated electronic device 900 in FIG. 9, applying the various techniques described above. It is noted that other processes, or variations of the process 1000, may instead be applied. The instructions recorded in the electronic device 910 in operation 840 may implement the process 1000 in part or in whole. At 1005, the calibrated electronic device 900 receives a sensed color measurement from the ambient color sensor 910 included in the calibrated electronic device 900. At 1010, the calibrated electronic device 900 selects a lighting cluster corresponding to the sensed color measurement, using cluster parameters stored in the calibrated electronic device 900. At 1015, the calibrated electronic device 900 obtains stored sensor-specific sensor correction parameters for the ambient color sensor 910. In some implementations, sensor-specific per-cluster sensor correction parameters are selected based on the lighting cluster selected in operation 1010. At 1020, the calibrated electronic device 900 calculates a corrected color measurement by applying the obtained sensor-specific sensor correction parameters obtained at 1015 to the color measurement received at 1005. At 1025, the calibrated electronic device 900 obtains stored generic per-cluster transformation parameters associated with the lighting cluster selected at 1010. At 1030, the calibrated electronic device 900 calculates a calibrated color value by applying the generic per-cluster transformation parameters obtained at 1025 to the corrected color measurement calculated at 1020. At 1035, the calibrated electronic device 900 responds to the calibrated color value using the resulting calibrated color value, such as, but not limited to, adjusting a color cast of an image presented via a display device.

Figure 11:
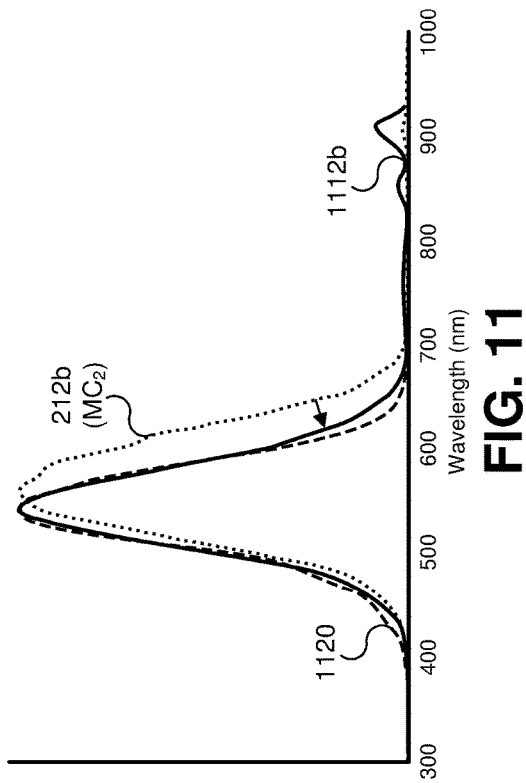
FIG. 11 illustrates further examples of spectral response profiles associated with the light detector most strongly responsive to green and yellow wavelengths in the ambient color sensor in FIG. 2 or related ambient color sensors in FIGS. 4, 7, and 9.

FIG. 11 illustrates further examples of spectral response profiles associated with the light detector 212b, which is most strongly responsive to green and yellow wavelengths, in the ambient color sensor 210 in FIG. 2 or related ambient color sensors 442, 712, and 910 in FIGS. 4, 7, and 9. A first response curve, shown with a dotted line, is for the light detector 212b, which is the most responsive to green and yellow wavelengths, as discussed in FIG. 3F. A second response curve 1112b, shown with a solid line, shows a spectral response profile for the light detector 212b for light received through an ambient ink with the profile shown in FIG. 3E. Among other things, second response curve 1112b demonstrates a visual wavelength response shifted to shorter wavelengths, with a peak response at about 540 nm. A third response curve 1120, shown with a dashed line, shows a photopic M cone response, which generally corresponds to the luminosity response of the human eye. As can be seen in FIG. 11, in the visible wavelengths the second response curve 1112b closely matches the third response curve 1120. In view of this, the color measurement component $MC_2$ for the light detector 212b provides a signal that is strongly predictive of ambient light luminosity, and may be referred to as a "brightness color measurement component" or a "brightness component." However, the second response curve 1112b also demonstrates an increased response in infrared wavelengths. As illustrated by the spectral emission profiles shown in FIGS. 3A-3D, various types of light sources can present significantly different infrared emission characteristics, which confounds use of the color measurement component $MC_2$ alone for estimating brightness of ambient light. It is noted that the second response curve 1112b shown in FIG. 11 reflects an average or nominal spectral response. There are variations in the spectral responses of individual ambient color sensors that can result in differences from the second response curve 1112b and from other ambient color sensors, particularly across different types of light sources.

Figure 12:
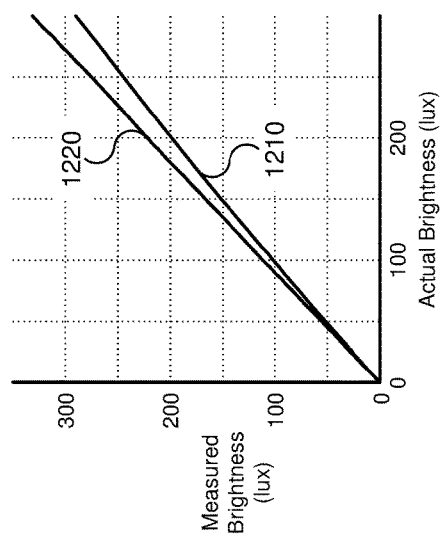
FIG. 12 illustrates an example of differences in estimated brightnesses obtained for different types of light sources by a conventional ambient light sensor.

FIG. 12 illustrates an example of differences in estimated brightnesses obtained for different types of light sources by a conventional ambient light sensor. The particular example shown in FIG. 12 is drawn from the datasheet for the MAX44009 ambient light sensor by Maxim Integrated of San Jose, Calif., United States. Despite the use of two photodiodes, one sensitive to visible and infrared wavelengths and the other sensitive to infrared wavelengths, and implementation of an infrared compensation scheme based on measurements from the two photodiodes, the MAX44009, and other conventional ambient light sensors, still exhibits the difference shown between a first brightness response 1210 for an incandescent light source and a second brightness response 1220 for a fluorescent light source, which increases with lux level. Thus, even conventional devices exclusively designed for ambient light brightness detection vary in response across different types of light sources.

Figure 13:
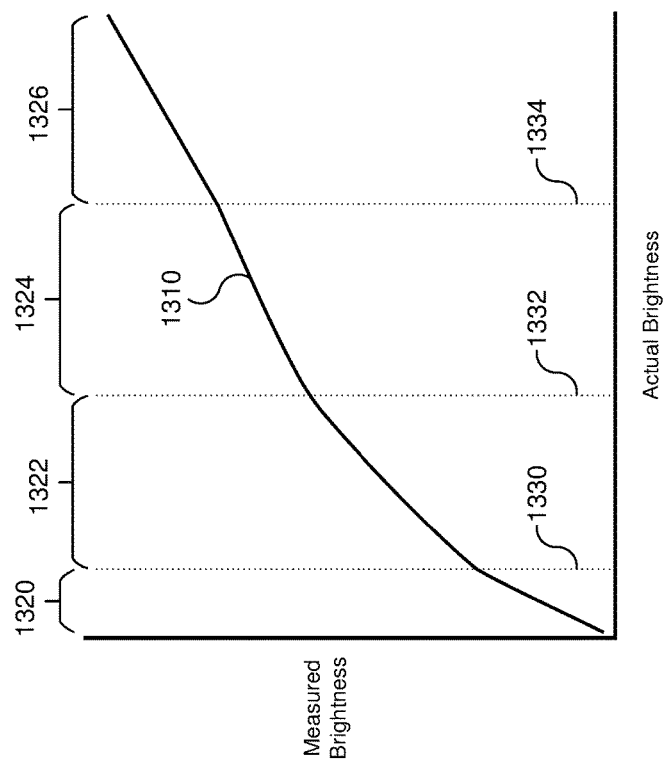
FIG. 13 illustrates an example brightness response curve 1310, showing variations in sensitivity for an ambient light sensor.

An additional challenge for estimating ambient light brightness is variation in sensitivity at different brightnesses. FIG. 13 illustrates an example brightness response curve 1310, showing variations in sensitivity for an ambient light sensor. FIG. 13 identifies a first brightness range 1320, from approximately zero actual brightness (or reference brightness as measured by a reference device) to approximately a first brightness 1330. In a second brightness range 1322, from approximately the first brightness 1330 to approximately a second brightness 1332, the ambient light sensor has a decreased sensitivity relative to the first brightness range 1320, as shown by a decreased slope of the brightness response curve 1310. In a third brightness range 1324, from approximately the second brightness 1332 to approximately a third brightness 1334, the ambient light sensor has a further decreased sensitivity. In a fourth brightness range 1326, starting at approximately the third brightness 1334, the ambient light sensor has an increased sensitivity relative to the third brightness range 1324.

The reference color measurements 452 collected for the reference ambient color sensors 422, electronic devices 710 and 900, their respective ambient color sensors 712 and 910 and corresponding color measurements, selection and use of lighting clusters, and other related features and techniques described above can be utilized, in combination with the techniques discussed below in FIGS. 14-16, to implement brightness estimation for the electronic devices 710 and 900 from color measurements obtained from the ambient color sensors 712 and 910. These techniques enable electronic devices 710 and 900 to accurately perform brightness estimation without including an additional ambient light sensor specialized for brightness estimation. Additionally, the described techniques offer consistent performance across different types of light sources.

Figure 14:
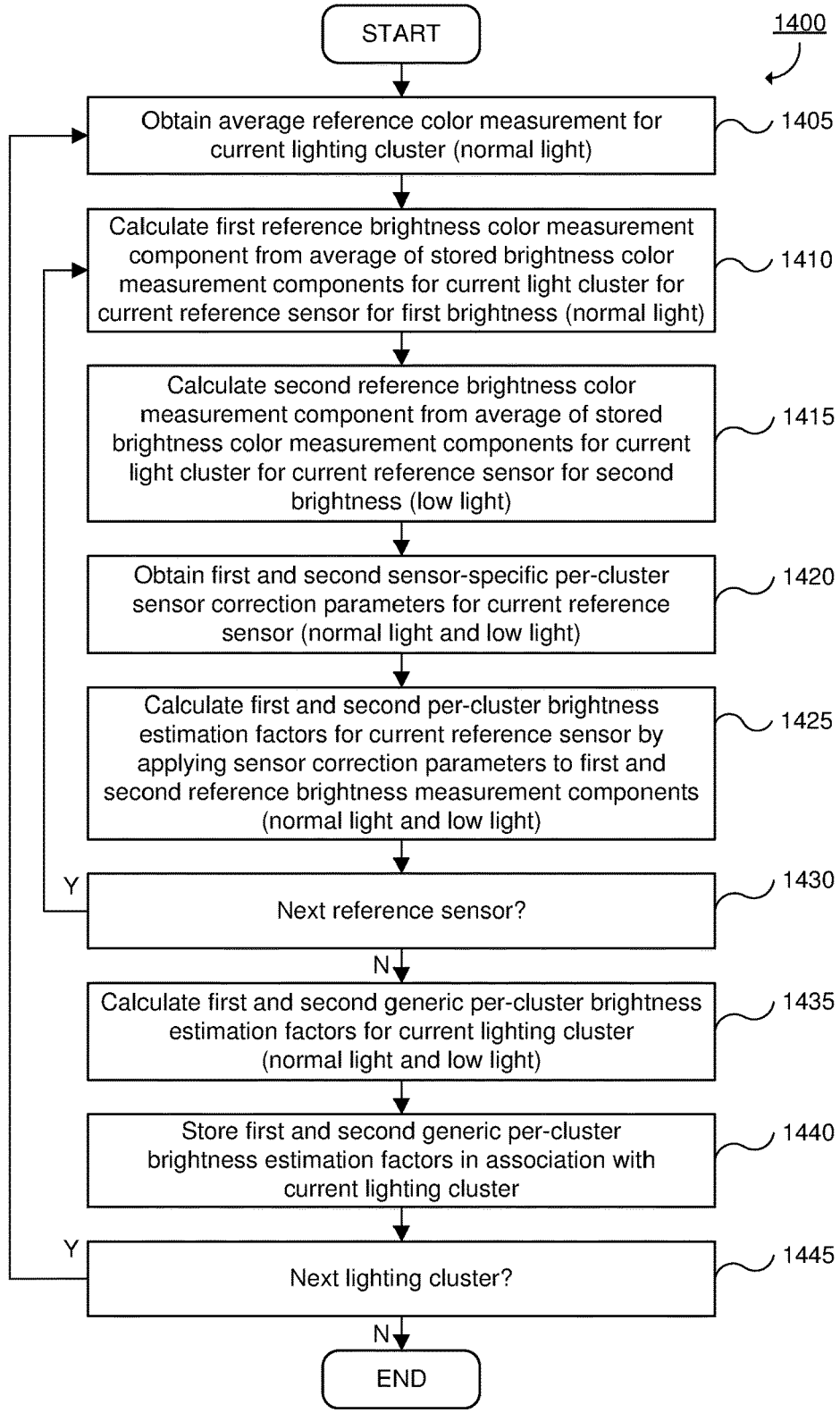
FIG. 14 illustrates an example process for use of the characterization system in FIG. 4 for characterizing reference sensors in connection with brightness estimation using ambient color sensors.

FIG. 14 illustrates an example process 1400 for use of the characterization system 400 in FIG. 4 for characterizing the reference sensors 422 in connection with brightness estimation using ambient color sensors 422, 712, and/or 900. It is noted that other processes, or variations of the process 1400, may instead be applied. The process 1400 may be used in combination with some or all of the features and techniques described in FIGS. 4-6 for characterizing the reference sensors 422 in connection with determining calibrated color values using ambient color sensors 422, 712, and/or 900. For process 1400, it is assumed that operations 605 through 630 in FIG. 6 have been performed, such that color measurements have been obtained for the reference sensors 422 and available as stored reference color measurements 452, and lighting clusters have been selected based on the stored reference color measurements 452. In some implementations, for each ambient lighting scenario color measurements are obtained for a first reference brightness ("L_ref_hi") and a second reference brightness ("L_ref_lo"). The second reference brightness L_ref_lo is less than the first reference brightness L_ref_hi, and may correspond to a "low light" brightness, such as around 100 lux. In some implementations, interpolation may be performed, based on the stored reference color measurements 452, to obtain an interpolated reference color measurement for the first reference brightness L_ref_hi and/or second reference brightness L_ref_lo, as needed. In FIGS. 14-16, the first and second reference brightnesses L_ref_hi and L_ref_lo are respectively referred to as "normal light" and "low light."

Operations 1405-1440 are performed for each lighting cluster in the lighting clusters selected as discussed for operation 625 in FIG. 6. Operations 1410-1425 are performed for each reference sensor in the reference sensors 422 (although the reference sensors 422 used for the process 1400 may be selected from a larger population of reference sensors, to exclude outliers). At 1405, using the stored reference color measurements 452 associated with the current lighting cluster, an average reference color measurement ("Sg_ref_hi") is obtained for the first reference brightness L_ref_hi. The average reference color measurement Sg_ref_hi may be calculated much as described for the first average reference color measurement in FIG. 7 (having color measurement components $R_1$, $R_2$, $R_3$, and $R_4$). The average reference color measurement Sg_ref_hi may be calculated using stored reference color measurements 452 for one calibration ambient lighting scenario associated with the current lighting group, or may be calculated using stored reference color measurements 452 for all ambient lighting scenarios associated with the current lighting group.

At 1410, using the stored reference color measurements 452 for the current reference sensor 422, the characterization system 400 calculates a first reference brightness color measurement component ("Ref_sensor_hi") from an average of the brightness color measurement components of selected stored reference color measurements 452 for the current lighting cluster for the first reference brightness L_ref_hi. Similarly, at 1415, using the stored reference color measurements 452 for the current reference sensor 422, the characterization system 400 calculates a second reference brightness color measurement component ("Ref_sensor_lo") from an average of the brightness color measurement components of selected stored reference color measurements 452 for the current lighting cluster for the second reference brightness L_ref_lo. The first and second reference brightness color measurement components Ref_sensor_hi and Ref_sensor_lo may be calculated using stored reference color measurements 452 for one calibration ambient lighting scenario associated with the current lighting group, or may be calculated using stored reference color measurements 452 for all ambient lighting scenarios associated with the current lighting group.

At 1420, a first sensor-specific (for the current reference sensor 422) per-cluster (for the current lighting cluster) sensor correction parameter ("P_hi") for the first reference brightness L_ref_hi is obtained. In some implementations, the first sensor-specific per-cluster sensor correction parameter P_hi is generated, based on stored reference color measurements 452 for the first reference brightness L_ref_hi, much as described for generating the sensor correction parameters 742 in FIG. 7. Also at 1420, a second sensor-specific (for the current reference sensor 422) per-cluster (for the current lighting cluster) sensor correction parameter ("P_lo") for the second reference brightness L_ref_lo to the second reference brightness color measurement component Ref_sensor_lo is obtained. In some implementations, the second sensor-specific per-cluster sensor correction parameter P_lo is generated, based on stored reference color measurements 452 for the second reference brightness L_ref_lo, much as described for generating the sensor correction parameters 742 in FIG. 7. In some examples, the first and second sensor-specific per-cluster sensor correction parameter P_hi and P_lo may be calculated as follows:

$$P\_hi = Sg\_ref\_hi / Ref\_sensor\_hi \quad (12)$$

$$P\_lo = Sg\_ref\_hi / Ref\_sensor\_lo \quad (13)$$

At 1425, a first per-cluster brightness estimation factor ("Br_est_hi") is calculated for the first reference brightness L_ref_hi by applying the first sensor-specific per-cluster sensor correction parameter P_hi to the first reference brightness color measurement component Ref_sensor_hi. Also at 1425, a second per-cluster brightness estimation factor ("Br_est_lo") is calculated for the second reference brightness L_ref_lo by applying the second sensor-specific per-cluster sensor correction parameter P_lo to the second reference brightness color measurement component Ref_sensor_lo. In some examples, the first and second per-cluster brightness estimation factors Br_est_hi and Br_est_lo may be calculated as follows:

$$Br\_est\_hi = Ref\_sensor\_hi \cdot P\_hi \quad (14)$$

$$Br\_est\_lo = Ref\_sensor\_lo \cdot P\_lo \quad (15)$$

At 1430, if there is another reference sensor 422 (1430, "Y"), operations 1410-1425 are repeated for the next reference sensor 422. As a result, at operation 1435, there are respective first and second per-cluster brightness estimation factors Br_est_hi and Br_est_lo for each of the reference sensors 422 processed by operations 1410-1425.

At 1435, based on the first per-cluster brightness estimation factors Br_est_hi calculated for each of the reference sensors 422 in operations 1410-1425, a first generic (not specific to an individual reference sensor 422) per-cluster brightness estimation factor ("Br_est_avg_hi") is calculated. In some examples, the first generic per-cluster brightness estimation factor Br_est_avg_hi is an average of the first per-cluster brightness estimation factors Br_est_hi calculated for the reference sensors 422. Also at 1435, based on the second per-cluster brightness estimation factors Br_est_lo calculated for each of the reference sensors 422 in operations 1410-1425, a second generic per-cluster brightness estimation factor ("Br_est_avg_lo") is calculated. In some examples, the second generic per-cluster brightness estimation factor Br_est_avg_lo is an average of the second per-cluster brightness estimation factors Br_est_lo calculated for the reference sensors 422. At 1440, the first and second generic per-cluster brightness estimation factors Br_est_avg_hi and Br_est_avg_lo are stored in association with the current lighting cluster. At 1445, if there is another lighting cluster (1445, "Y"), operations 1405-1440 are repeated for the next lighting cluster.

Figure 15:
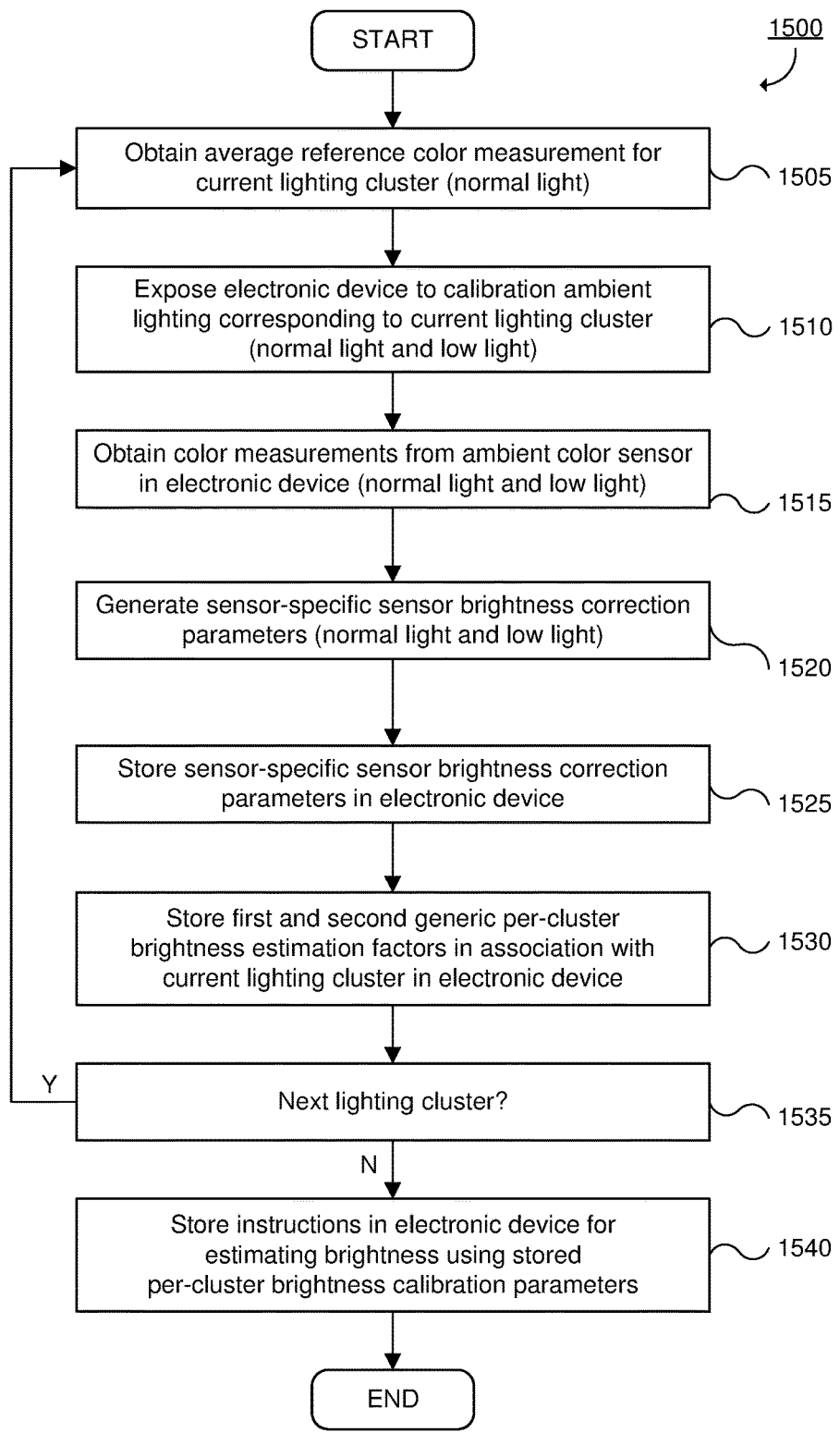
FIG. 15 illustrates an example process for use of the sensor calibration system in FIG. 7 for performing sensor-specific characterization and configuration of an electronic device for brightness estimation using an ambient color sensor included in the electronic device.

FIG. 15 illustrates an example process 1500 for use of the sensor calibration system 700 in FIG. 7 for performing sensor-specific calibration and configuration of the electronic device 710 for brightness estimation using the ambient color sensor 712 included in the electronic device 710. It is noted that other processes, or variations of the process 1500, may instead be applied. The process 1500 may be used in combination with some or all of the features and techniques described in FIGS. 7 and 8 for performing sensor-specific calibration and configuration of the electronic device 710 for determining calibrated color values using the ambient color sensor 712.

Operations 1505-1530 are performed for each lighting cluster in the lighting clusters selected as discussed for FIG. 14. At 1505, using the stored reference color measurements 452 associated with the current lighting cluster, an average reference color measurement ("Sg_ref_hi") is obtained for the first reference brightness L_ref_hi, as described above for operation 1405 in FIG. 14. The average reference color measurement Sg_ref_hi may be calculated using stored reference color measurements 452 for one calibration ambient lighting scenario associated with the current lighting group, or may be calculated using stored reference color measurements 452 for all ambient lighting scenarios associated with the current lighting group. In some implementations, the average reference color measurement Sg_ref_hi obtained in operation 1405 is stored and reused for operation 1505.

At 1510, much as described for operation 805 in FIG. 8 and in FIG. 7, the electronic device 710 is exposed to a calibration ambient lighting 720 corresponding to a current lighting cluster. At 1515, a first color measurement ("Sg_hi") is obtained from the ambient color sensor 712 included in the electronic device 710 at about the first reference brightness L_ref_hi, and a second color measurement ("Sg_lo") is obtained from the ambient color sensor 712 at about the second reference brightness L_ref_lo. In some implementations, the different first and second reference brightnesses L_ref_hi and L_ref_lo are achieved by changing a distance between the electronic device 710 and the calibration ambient lighting 720. In some implementations, operations 1510 and 1515 may be combined with operations 805 and 810, with process 800 making use of the first color measurement Sg_hi.

At 1520, the sensor calibration system 700 generates first sensor-specific (specific to the ambient color sensor 712) sensor brightness correction parameters ("Ct_hi") for the first reference brightness L_ref_hi, and generates second sensor-specific sensor brightness correction parameters ("Ct_lo") for the second reference brightness L_ref_lo. In some implementations, at 1520, the sensor calibration system 700 generates, for the current lighting cluster, first sensor-specific (specific to the ambient color sensor 712) per-cluster (for the current lighting cluster) sensor brightness correction parameters Ct_hi for the first reference brightness L_ref_hi, and generates second sensor-specific per-cluster sensor brightness correction parameters Ct_lo for the second reference brightness L_ref_lo. In some examples, the first and second sensor-specific sensor brightness correction parameters Ct_hi and Ct_lo may be generated as follows:

$$Ct\_hi = Sg\_ref\_hi / Sg\_hi \quad (16)$$

$$Ct\_lo = Sg\_ref\_hi / Sg\_lo \quad (17)$$

In some implementations, the sensor-specific sensor brightness correction parameters more directly correspond to the color measurements obtained in operation 1515 (such as, but not limited to, a value of the brightness measurement component). In some implementations, in contrast to the sensor-specific sensor correction parameters calculated in operation 815 of FIG. 8, the first and second sensor-specific per-cluster sensor brightness correction parameters Ct_hi and Ct_lo are each simply scalar values generates for a brightness color measurement component (such as color measurement component $MC_2$) of the color measurements obtained for the ambient color sensor 712.

At 1525, the sensor-specific sensor brightness correction parameters generated in operation 1520 (for example, the first and second sensor-specific sensor brightness correction parameters Ct_hi and Ct_lo) are stored in the electronic device 710. In an implementation in which sensor-specific per-cluster sensor brightness correction parameters have been generated for the current lighting cluster, the sensor-specific per-cluster sensor brightness correction parameters generated in operation 1520 are stored in the electronic device 710 in association with the current lighting cluster.

In some implementations, the process 1500 is modified from the above description to generate common sensor-specific sensor brightness correction parameters for different brightness ranges or levels. In such implementations, operation 1510 may be modified to expose the electronic device 710 to only one brightness level, operation 1515 may be modified to obtain color measurements for only one brightness level, and operation 1520 may be modified to generate single common sensor-specific sensor brightness correction parameters for use across brightness ranges or levels (for example, for substantially all brightness levels). This allows a number of color measurement operations to be reduced and a resulting reduction in manufacturing time and complexity.

At 1530, the first and second generic per-cluster brightness estimation factors Br_est_avg_hi and Br_est_avg_lo calculated in operation 1430 are stored in electronic device association with the current lighting cluster. At 1535, if there is another lighting cluster, operations 1505-1530 are repeated for the next lighting cluster. At 1540, instructions are stored in the electronic device 710 for estimating brightness of ambient light based on color measurements obtained from the ambient color sensor 712, using the brightness calibration parameters stored in the electronic device 710 at 1525 and 1530. In some examples, these instructions are included in the operational program instructions 960 described in FIG. 9.

In some implementations, the process 1500 is modified from the above description to make use of only a single calibration ambient lighting, rather than a separate calibration ambient lighting for each of the lighting clusters. In such implementations, the operation 1535 is omitted, and the instructions stored in operation 1540 are configured to apply the sensor-specific brightness correction parameters generated in operation 1520 and stored in operation 1525 across all of the lighting clusters (or without regard to an identified lighting cluster). In some examples, the single calibration ambient lighting may not correspond to any of the identified lighting clusters. This allows a number of color measurement operations to be reduced and a resulting reduction in manufacturing time and complexity.

Figure 16:
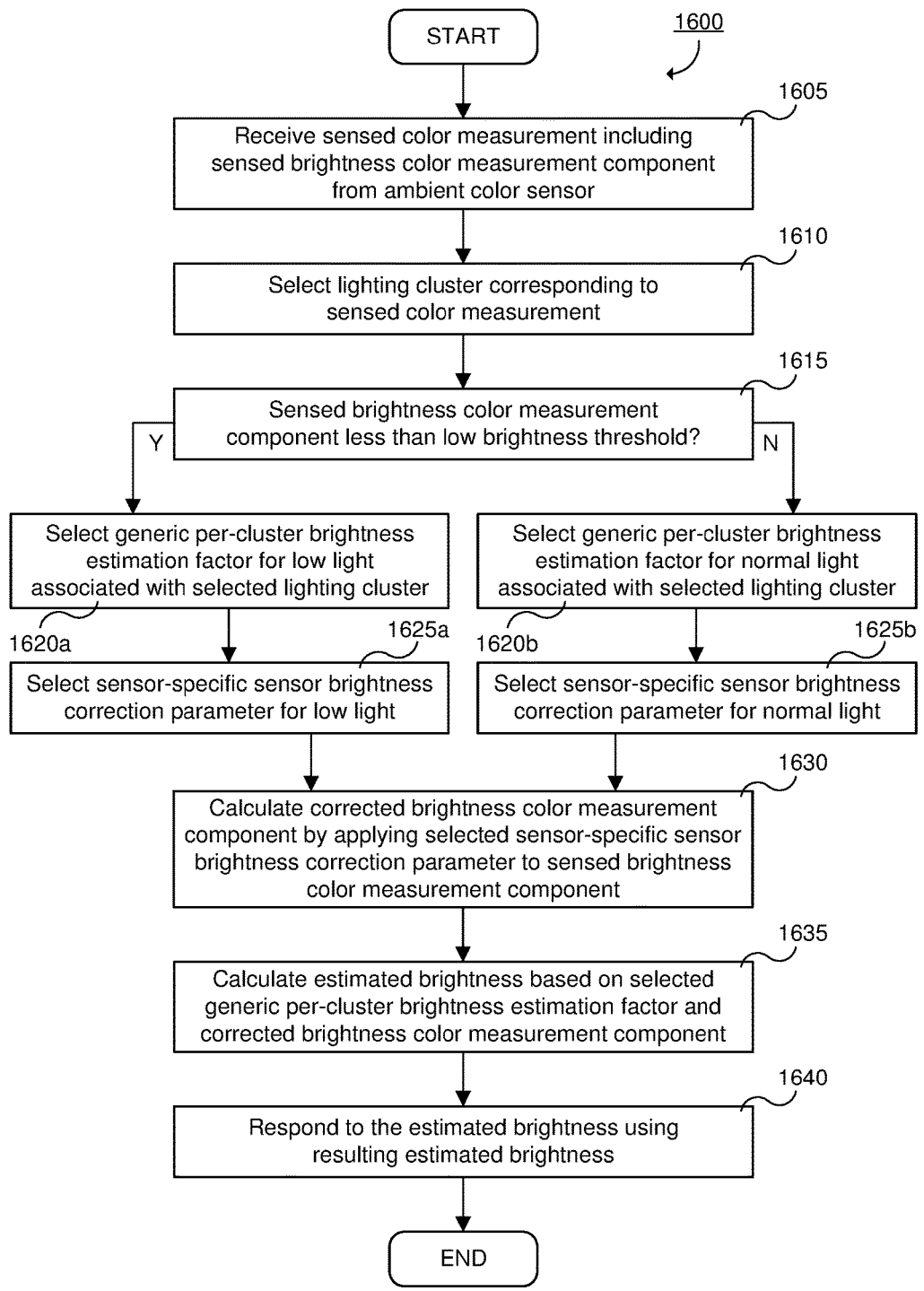
FIG. 16 illustrates an example process for estimating brightness using the ambient color sensor included in the calibrated electronic device in FIG. 9, as calibrated according to the process in FIG. 15.

FIG. 16 illustrates an example process 1600 for estimating brightness using the ambient color sensor 910 included in the calibrated electronic device 900 in FIG. 9, as calibrated according to the process 1500 in FIG. 15. It is noted that other processes, or variations of the process 1600, may instead be applied. The process 1600 may be used in combination with some or all of the features and techniques described in FIGS. 9 and 10 for generating calibrated color values with the calibrated electronic device 900 in FIG. 9. The instructions recorded in the electronic device 910 in operations 840 and 1540 may implement the process 1600 in part or in whole.

At 1605, the calibrated electronic device 900 receives a sensed color measurement ("M"), including a sensed brightness color measurement component ("$MC_2$"), from the ambient color sensor 910 included in the calibrated electronic device 900, as described for operation 1005 in FIG. 10 and in FIG. 9. At 1610, the calibrated electronic device 900 selects a lighting cluster corresponding to the received sensed color measurement M, using cluster parameters stored in the calibrated electronic device 900, as described for operation 1010 in FIG. 10 and in FIG. 9. In some implementations, operations 1605 and 1610 may be combined with operations 1005 and 1010, with some or all of the color measurements received at 1005 and the lighting clusters selected at 1010 used for both generating calibrated color values and estimating brightness using the ambient color sensor 910.

At 1615, the calibrated electronic device 900 determines whether the sensed brightness color measurement component $MC_2$ is less than a low light brightness threshold. In some implementations, the calibrated electronic device 900 is configured to utilize a per-cluster low light threshold. In response to a determination that the sensed brightness color measurement component $MC_2$ is less than the low light brightness threshold (1615, 'Y'), the process 1600 proceeds to operation 1620a, in which the calibrated electronic device 900 selects the generic per-cluster brightness estimation factor Br_est_avg_lo (calculated in operation 1430 of FIG. 14 and stored in the electronic device 900 in operation 1530 of FIG. 15) for the second reference brightness L_ref_lo associated with the lighting cluster selected at 1610 as a selected generic per-cluster brightness estimation factor ("Br_est_avg_sel"). At 1625a, the calibrated electronic device 900 selects the second sensor-specific sensor brightness correction parameters Ct_lo (calculated in operation 1520 of FIG. 15 and stored in the electronic device 900 in operation 1525 of FIG. 15) for the second reference brightness L_ref_lo as selected sensor-specific sensor brightness correction parameters ("Ct_sel"). In some implementations, at 1625a, the calibrated electronic device 900 selects the second sensor-specific per-cluster sensor brightness correction parameters Ct_lo for the second reference brightness L_ref_lo associated with lighting cluster selected at 1610 as the selected sensor-specific sensor brightness correction parameters Ct_sel. Then the process 1600 proceeds to operation 1630.

In response to a determination that the sensed brightness color measurement component $MC_2$ is not less than the low light brightness threshold (1615, 'N'), the process 1600 proceeds to operation 1620b, in which the calibrated electronic device 900 selects the generic per-cluster brightness estimation factor Br_est_avg_lo (calculated in operation 1430 of FIG. 14 and stored in the electronic device 900 in operation 1530 of FIG. 15) for the first reference brightness L_ref_hi associated with the lighting cluster selected at 1610 as the selected generic per-cluster brightness estimation factor Br_est_avg_sel. At 1625b, the calibrated electronic device 900 selects the first sensor-specific sensor brightness correction parameters Ct_hi (calculated in operation 1520 of FIG. 15 and stored in the electronic device 900 in operation 1525 of FIG. 15) for the first reference brightness L_ref_hi as the selected sensor-specific sensor brightness correction parameters Ct_sel. In some implementations, at 1625b, the calibrated electronic device 900 selects the first sensor-specific per-cluster sensor brightness correction parameters Ct_hi for the first reference brightness L_ref_hi associated with lighting cluster selected at 1610 as the selected sensor-specific sensor brightness correction parameters Ct_sel. Then the process 1600 proceeds to operation 1630.

In some implementations, the operations 1620a and 1620b are implemented as a single operation, in which the selection of the selected sensor-specific sensor brightness correction parameters Ct_sel is not based on the determination in operation 1615 of whether the sensed brightness color measurement component $MC_2$ is less than a low light brightness threshold. For example, instead of selecting between the first and second sensor-specific sensor brightness correction parameters Ct_hi and Ct_lo based on the sensed brightness color measurement component $MC_2$, single common sensor-specific sensor brightness correction parameters may be used across brightness ranges or levels.

At 1630, the calibrated electronic device 900 calculates a corrected brightness color measurement component ("$MC_2$ corr") by applying the selected sensor-specific per-cluster sensor brightness correction parameters Ct_sel selected in operation 1625a or 1625b to the sensed brightness color measurement component $MC_2$ included in the sensed color measurement M received in operation 1605. In some examples, the corrected brightness color measurement component $MC_2$ corr may be calculated as follows:

$$MC_{2\_corr} = MC_2 \cdot Ct\_sel \quad (18)$$

At 1635, the electronic device 900 calculates an estimated brightness ("Br_pred") based on the selected generic per-cluster brightness estimation factor Br_est_avg_sel (selected in operation 1620a or 1620b) and the corrected brightness color measurement component $MC_{2\_corr}$ (calculated in operation 1630). In some examples, the estimated brightness Br_pred may be calculated as follows:

$$Br\_pred = (MC_{2\_corr}/Br\_est\_avg\_sel) \cdot L\_ref\_hi\_value \quad (19)$$

Where L_ref_hi_value is a numeric value associated with the first reference brightness L_ref_hi. For example, where the first reference brightness L_ref_hi is 1000 lux and it is desired for Br_pred to be calculated in lux, L_ref_hi_value may be assigned a numeric value of '1000'.

At 1640, the calibrated electronic device 900 responds to the predicted brightness Br_pred resulting from the operation 1635, such as, but not limited to, adjusting an intensity of a backlight for a display device and/or an intensity of an image presented via the display device. In some implementations, the operation 1640 may be combined with the operation 1035 in FIG. 10 in which the calibrated electronic device 900 responds to the calibrated color value obtained in operation 1030, resulting in a response based on both the predicted brightness Br_pred from the process 1600 and the calibrated color value from the process 1000.

It is noted that the techniques described in FIGS. 14-16 are not limited to preforming brightness calibration and estimation for two brightness ranges (low light situations associated with the second reference brightness L_ref_lo and other light situations associated with the first reference brightness L_ref_hi). In some implementations, calibration is performed for three or more brightness ranges, much as described for two brightness ranges. In such implementations, three different sets of values, factors, and/or parameters are obtained and applied. For example, with reference to FIG. 13, the four brightness ranges 1320, 1322, 1324, and 1326 might be supported, to more accurately reflect variations in sensitivity occurring in the different brightness ranges 1320, 1322, 1324, and 1326. In some implementations, calibration is performed for only a single brightness range, essentially applying a same estimated sensitivity across all or most levels of brightness.

The sensor calibration data 930 described in FIG. 9 may further include the sensor-specific per-cluster brightness correction parameters used in operation 1630 and the generic per-cluster brightness estimation factors used in operation 1635. In some implementations, the calibration data storage 972 also stores such information for delivery to the calibrated electronic device 900 by the calibration data delivery system 970. In some examples, the updates 976 received by the calibrated electronic device 900 from the operating code delivery system 974 include updates to the instructions stored in the calibrated electronic device 900 in operation 1540.

The examples of systems and modules for providing per-sensor calibration for brightness estimation using ambient color sensors, according to the disclosure, are presented herein for illustration of the disclosure and its benefits. Such examples of use should not be construed to be limitations on the logical process embodiments of the disclosure, nor should variations of user interface methods from those described herein be considered outside the scope of the present disclosure. Certain embodiments are described herein as including modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 17:
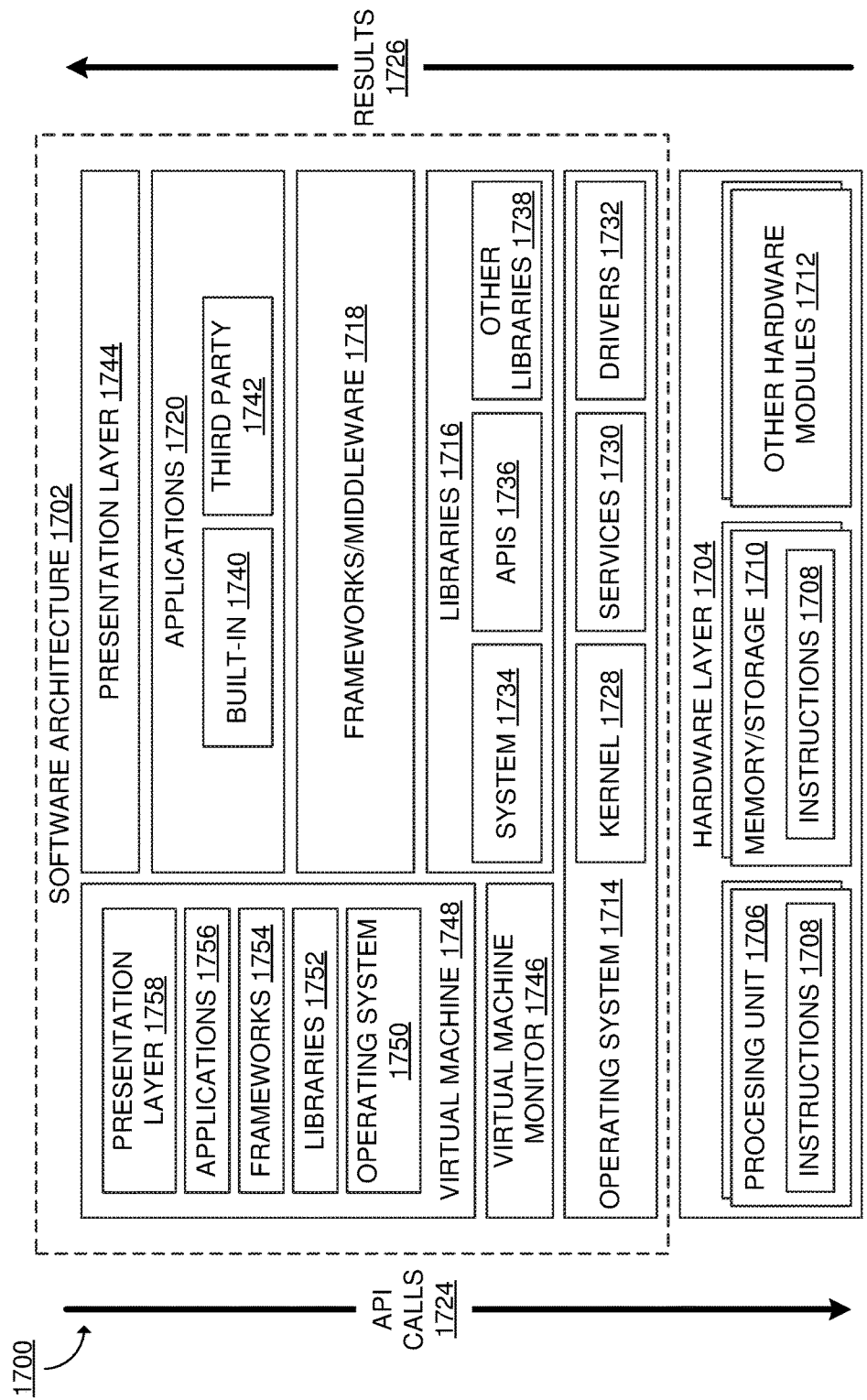
FIG. 17 is a block diagram illustrating an example software architecture, various portions of which may be used in conjunction with various hardware architectures herein described.

FIG. 17 is a block diagram 1700 illustrating an example software architecture 1702, various portions of which may be used in conjunction with various hardware architectures herein described, which may implement any of the above-described features. FIG. 17 is a non-limiting example of a software architecture and it will be appreciated that many other architectures may be implemented to facilitate the functionality described herein. The software architecture 1702 may execute on hardware such as a machine 1800 of FIG. 18 that includes, among other things, processors 1810, memory 1830, and input/output (I/O) components 1850. A representative hardware layer 1704 is illustrated and can represent, for example, the machine 1800 of FIG. 18. The representative hardware layer 1704 includes a processing unit 1706 and associated executable instructions 1708. The executable instructions 1708 represent executable instructions of the software architecture 1702, including implementation of the methods, modules and so forth described herein. The hardware layer 1704 also includes a memory/storage 1710, which also includes the executable instructions 1708 and accompanying data. The hardware layer 1704 may also include other hardware modules 1718. Instructions 1708 held by processing unit 1708 may be portions of instructions 1708 held by the memory/storage 1710.

The example software architecture 1702 may be conceptualized as layers, each providing various functionality. For example, the software architecture 1702 may include layers and components such as an operating system (OS) 1714, libraries 1716, frameworks 1718, applications 1720, and a presentation layer 1744. Operationally, the applications 1720 and/or other components within the layers may invoke API calls 1724 to other layers and receive corresponding results 1726. The layers illustrated are representative in nature and other software architectures may include additional or different layers. For example, some mobile or special purpose operating systems may not provide the frameworks/middleware 1718.

The OS 1714 may manage hardware resources and provide common services. The OS 1714 may include, for example, a kernel 1728, services 1730, and drivers 1732. The kernel 1728 may act as an abstraction layer between the hardware layer 1704 and other software layers. For example, the kernel 1728 may be responsible for memory management, processor management (for example, scheduling), component management, networking, security settings, and so on. The services 1730 may provide other common services for the other software layers. The drivers 1732 may be responsible for controlling or interfacing with the underlying hardware layer 1704. For instance, the drivers 1732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1716 may provide a common infrastructure that may be used by the applications 1720 and/or other components and/or layers. The libraries 1716 typically provide functionality for use by other software modules to perform tasks, rather than interacting directly with the OS 1714. The libraries 1716 may include system libraries 1734 (for example, C standard library) that may provide functions such as memory allocation, string manipulation, file operations. In addition, the libraries 1716 may include API libraries 1736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1716 may also include a wide variety of other libraries 1738 to provide many functions for applications 1720 and other software modules.

The frameworks 1718 (also sometimes referred to as middleware) provide a higher-level common infrastructure that may be used by the applications 1720 and/or other software modules. For example, the frameworks 1718 may provide various graphic user interface (GUI) functions, high-level resource management, or high-level location services. The frameworks 1718 may provide a broad spectrum of other APIs for applications 1720 and/or other software modules.

The applications 1720 include built-in applications 1740 and/or third-party applications 1742. Examples of built-in applications 1740 may include, but are not limited to, a contacts application, a browser application, a location application, a media application, a messaging application, and/or a game application. Third-party applications 1742 may include any applications developed by an entity other than the vendor of the particular platform. The applications 1720 may use functions available via OS 1714, libraries 1716, frameworks 1718, and presentation layer 1744 to create user interfaces to interact with users.

Some software architectures use virtual machines, as illustrated by a virtual machine 1748. The virtual machine 1748 provides an execution environment where applications/modules can execute as if they were executing on a hardware machine (such as the machine 1800 of FIG. 18, for example). The virtual machine 1748 may be hosted by a host OS (for example, OS 1714) or hypervisor, and may have a virtual machine monitor 1746 which manages operation of the virtual machine 1748 and interoperation with the host operating system. A software architecture, which may be different from software architecture 1702 outside of the virtual machine, executes within the virtual machine 1748 such as an OS 1720, libraries 1722, frameworks 1724, applications 1726, and/or a presentation layer 1728.

Figure 18:
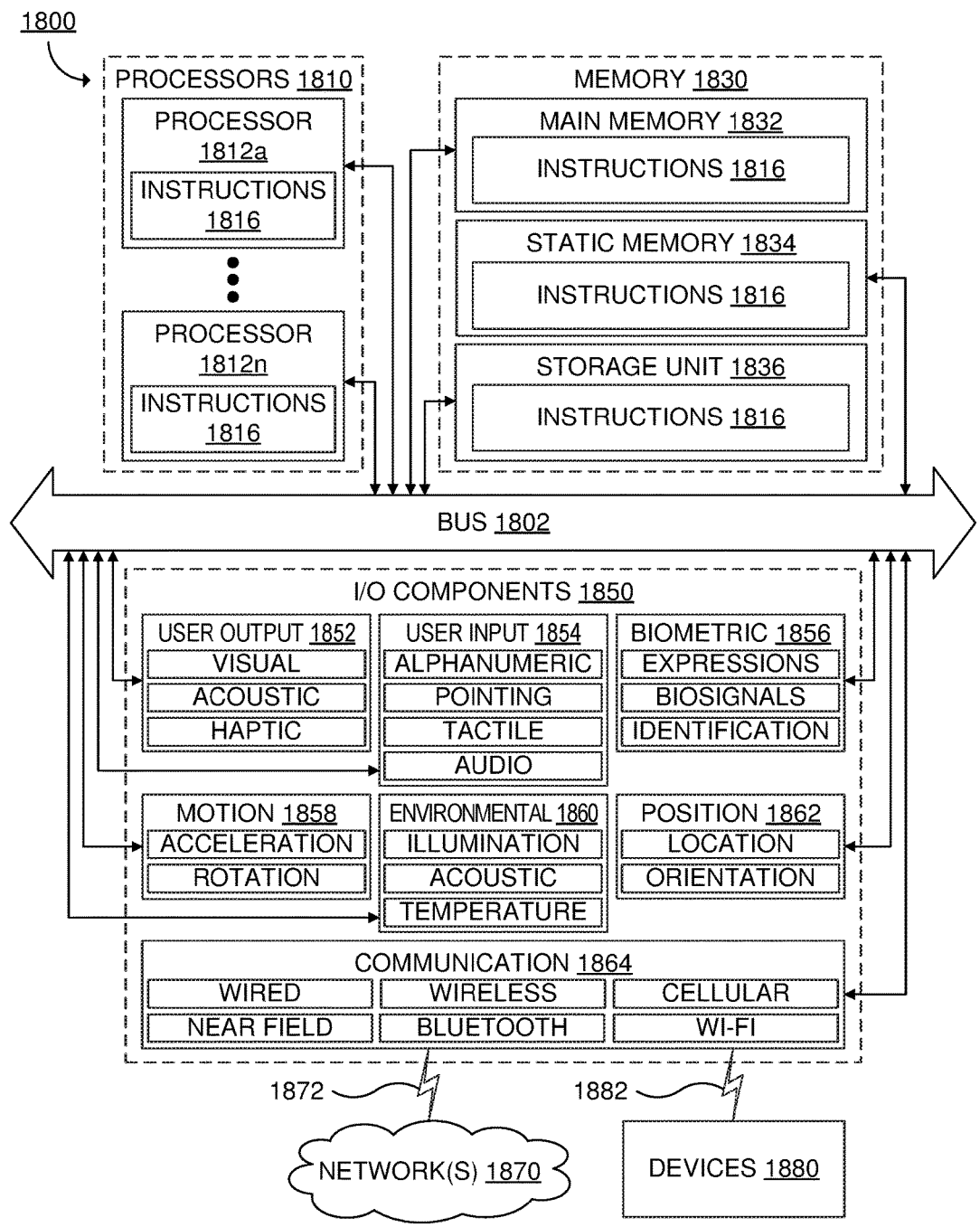
FIG. 18 is a block diagram illustrating components of an example machine configured to read instructions from a machine-readable medium.

FIG. 18 is a block diagram illustrating components of an example machine 1800 configured to read instructions from a machine-readable medium (for example, a machine-readable storage medium) and perform any of the features described herein. The example machine 1800 is in a form of a computer system, within which instructions 1816 (for example, in the form of software components) for causing the machine 1800 to perform any of the features described herein may be executed. As such, the instructions 1816 may be used to implement modules or components described herein. The instructions 1816 cause unprogrammed and/or unconfigured machine 1800 to operate as a particular machine configured to carry out the described features. The machine 1800 may be configured to operate as a standalone device or may be coupled (for example, networked) to other machines. In a networked deployment, the machine 1800 may operate in the capacity of a server machine or a client machine in a server-client network environment, or as a node in a peer-to-peer or distributed network environment. Machine 1800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1800 is illustrated, the term "machine" include a collection of machines that individually or jointly execute the instructions 1816.

The machine 1800 may include processors 1810, memory 1830, and I/O components 1850, which may be communicatively coupled via, for example, a bus 1802. The bus 1802 may include multiple buses coupling various elements of machine 1800 via various bus technologies and protocols. In an example, the processors 1810 (including, for example, a central processing unit (CPU), a graphics processing unit (GPU), a digital signal processor (DSP), an ASIC, or a suitable combination thereof) may include one or more processors 1812*a* to 1812*n* that may execute the instructions 1816 and process data. In some examples, one or more processors 1810 may execute instructions provided or identified by one or more other processors 1810. The term "processor" includes a multi-core processor including cores that may execute instructions contemporaneously. Although FIG. 18 shows multiple processors, the machine 1800 may include a single processor with a single core, a single processor with multiple cores (for example, a multi-core processor), multiple processors each with a single core, multiple processors each with multiple cores, or any combination thereof. In some examples, the machine 1800 may include multiple processors distributed among multiple machines.

The memory/storage 1830 may include a main memory 1832, a static memory 1834, or other memory, and a storage unit 1836, both accessible to the processors 1810 such as via the bus 1802. The storage unit 1836 and memory 1832, 1834 store instructions 1816 embodying any one or more of the functions described herein. The memory/storage 1830 may also store temporary, intermediate, and/or long-term data for processors 1810. The instructions 1816 may also reside, completely or partially, within the memory 1832, 1834, within the storage unit 1836, within at least one of the processors 1810 (for example, within a command buffer or cache memory), within memory at least one of I/O components 1850, or any suitable combination thereof, during execution thereof. Accordingly, the memory 1832, 1834, the storage unit 1836, memory in processors 1810, and memory in I/O components 1850 are examples of machine-readable media.

As used herein, "machine-readable medium" refers to a device able to temporarily or permanently store instructions and data that cause machine 1800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1816) for execution by a machine 1800 such that the instructions, when executed by one or more processors 1810 of the machine 1800, cause the machine 1800 to perform and one or more of the features described herein. Accordingly, a "machine-readable medium" may refer to a single storage device, as well as "cloud-based" storage systems or storage networks that include multiple storage apparatus or devices.

The I/O components 1850 may include a wide variety of hardware components adapted to receive input, provide output, produce output, transmit information, exchange information, capture measurements, and so on. The specific I/O components 1850 included in a particular machine will depend on the type and/or function of the machine. For example, mobile devices such as mobile phones may include a touch input device, whereas a headless server or IoT device may not include such a touch input device. The particular examples of I/O components illustrated in FIG. 18 are in no way limiting, and other types of components may be included in machine 1800. The grouping of I/O components 1850 are merely for simplifying this discussion, and the grouping is in no way limiting. In various examples, the I/O components 1850 may include user output components 1852 and user input components 1854. User output components 1852 may include, for example, display components for displaying information (for example, a liquid crystal display (LCD) or a projector), acoustic components (for example, speakers), haptic components (for example, a vibratory motor or force-feedback device), and/or other signal generators. User input components 1854 may include, for example, alphanumeric input components (for example, a keyboard or a touch screen), pointing components (for example, a mouse, a touchpad, or another pointing instrument), tactile input components (for example, a physical button or a touch screen that provides location and/or force of touches or touch gestures), and/or audio input components (for example, a microphone) configured for receiving various user inputs, such as user commands and/or selections.

In some examples, the I/O components 1850 may include biometric components 1856, motion components 1858, environmental components 1860, and/or position components 1862, among a wide array of other components. The biometric components 1856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facile-based identification). The motion components 1858 may include, for example, acceleration sensors (for example, an accelerometer) and rotation sensors (for example, a gyroscope). The environmental components 1860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1862 may include, for example, location sensors (for example, a Global Position System (GPS) receiver), altitude sensors (for example, an air pressure sensor from which altitude may be derived), and/or orientation sensors (for example, magnetometers).

The I/O components 1850 may include communication components 1864, implementing a wide variety of technologies operable to couple the machine 1800 to network(s) 1870 and/or device(s) 1880 via respective communicative couplings 1872 and 1882. The communication components 1864 may include one or more network interface components or other suitable devices to interface with the network(s) 1870. The communication components 1864 may include, for example, components adapted to provide wired communication, wireless communication, cellular communication, Near Field Communication (NFC), Bluetooth communication, Wi-Fi, and/or communication via other modalities. The device(s) 1880 may include other machines or various peripheral devices (for example, coupled via USB).

In some examples, the communication components 1864 may detect identifiers or include components adapted to detect identifiers. For example, the communication components 1864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of ambient color sensor calibration for brightness estimation, the method comprising:

obtaining a first plurality of reference color measurements produced by each of a first plurality of reference ambient color sensors for each of a plurality of ambient lighting scenarios, wherein each color measurement includes a plurality of color measurement components indicating an amount of ambient light measured by a respective one of a plurality of light detectors having substantially different spectral response profiles, wherein the plurality of color measurement components includes a first color measurement component;

automatically clustering the first plurality of reference color measurements into a first plurality of lighting clusters based on the color measurement components included in the first plurality of reference color measurements, wherein the first plurality of lighting clusters includes a first lighting cluster;

storing cluster parameters effective for automatically identifying which of the first plurality of lighting clusters is associated with a color measurement obtained from an ambient color sensor;

for each reference ambient color sensor included in the first plurality of reference ambient color sensors:
selecting a second plurality of reference color measurements from the first plurality of reference color measurements, based on at least each of the second plurality of reference color measurements being associated with the first lighting cluster, from the reference ambient color sensor, and for an ambient lighting condition at approximately a first reference brightness level,
selecting a third plurality of reference color measurements from the first plurality of reference color measurements, based on at least each of the third plurality of reference color measurements being associated with the first lighting cluster, from the reference ambient color sensor, and for an ambient lighting condition at approximately a second reference brightness level that is less than the first reference brightness level,
calculating a first reference brightness color measurement component for the first reference brightness level based on an average of the first color measurement components included in the second plurality of reference color measurements,
calculating a second reference brightness reference color measurement component for the second reference brightness level based on an average of the first color measurement components included in the third plurality of reference color measurements,
calculating, based on at least the first reference brightness color measurement component, a first sensor-specific per-cluster brightness estimation factor for the reference ambient color sensor for the first brightness level, and
calculating, based on at least the second reference brightness color measurement component, a second sensor-specific per-cluster brightness estimation factor for the reference ambient color sensor for the second brightness level;

calculating a first generic per-cluster brightness estimation factor for the first brightness level based on the first sensor-specific per-cluster brightness estimation factors calculated for the first plurality of reference ambient color sensors;

calculating a second generic per-cluster brightness estimation factor for the second brightness level based on the second sensor-specific per-cluster brightness estimation factors calculated for the first plurality of reference ambient color sensors; and storing the first generic per-cluster brightness estimation factor and the second generic per-cluster brightness estimation factor in association with the first lighting cluster.

2. The method of claim 1, wherein:

the first plurality of lighting clusters includes a second lighting cluster different from the first lighting cluster; and the method further comprises:
for each reference ambient color sensor included in the first plurality of reference ambient color sensors:
selecting a fourth plurality of reference color measurements from the first plurality of reference color measurements, based on at least each of the fourth plurality of reference color measurements being associated with the second lighting cluster, from the reference ambient color sensor, and for an ambient lighting condition at approximately the first reference brightness level,
selecting a fifth plurality of reference color measurements from the first plurality of reference color measurements, based on at least each of the fifth plurality of reference color measurements being associated with the second lighting cluster, from the reference ambient color sensor, and for an ambient lighting condition at approximately the second reference brightness level,
calculating a third reference brightness color measurement component for the first reference brightness level based on an average of the first color measurement components included in the fourth plurality of reference color measurements,
calculating a fourth brightness reference color measurement component for the second reference brightness level based on an average of the first color measurement components included in the fifth plurality of reference color measurements,
calculating, based on at least the third reference brightness color measurement component, a third sensor-specific per-cluster brightness estimation factor for the reference ambient color sensor for the first brightness level, and
calculating, based on at least the fourth reference brightness color measurement component, a fourth sensor-specific per-cluster brightness estimation factor for the reference ambient color sensor for the second brightness level,
calculating a third generic per-cluster brightness estimation factor for the first brightness level based on the third sensor-specific per-cluster brightness estimation factors calculated for the first plurality of reference ambient color sensors,
calculating a fourth generic per-cluster brightness estimation factor for the second brightness level based on the fourth sensor-specific per-cluster brightness estimation factors calculated for the first plurality of reference ambient color sensors, and
storing the third generic per-cluster brightness estimation factor and the fourth generic per-cluster brightness estimation factor in association with the second lighting cluster.

3. The method of claim 1, wherein each of the plurality of ambient lighting scenarios has a substantially different spectral emission profile.

4. The method of claim 1, further comprising:

obtaining a second plurality of color measurements for one or more additional reference ambient color sensors not included in the first plurality of reference ambient color sensors; and identifying the one or more reference additional ambient color sensors as outlier sensors based on one or more of the first plurality of color measurements and one or more of the second plurality of color measurements.

5. The method of claim 1, further comprising:

calculating, for each color measurement included in the plurality of color measurements, a respective ratio of a first color measurement component of the color measurement to a second color measurement component of the color measurement, wherein the clustering is determined using the ratios as a dimension.

6. The method of claim 1, wherein the clustering comprises:

automatically clustering the first plurality of color measurements into a second plurality of lighting clusters based on the color measurement components included in the first plurality of color measurements, wherein at least one of the second plurality of lighting clusters is included in the first plurality of lighting clusters; and automatically clustering the first plurality of color measurements associated with one of the second plurality of lighting clusters into a third plurality of lighting clusters based on a dimension not used for clustering the first plurality of color measurements into the second plurality of lighting clusters, wherein each of the third plurality of lighting clusters is included in the first plurality of lighting clusters.

7. A method for calibrating an ambient color sensor included in an electronic device for brightness estimation, the method comprising:

for each lighting cluster included in a first plurality of lighting clusters:
exposing the ambient color sensor to a calibration ambient lighting scenario corresponding to the lighting cluster,
obtaining a first color measurement produced by the ambient color sensor in response to being exposed to the calibration ambient lighting scenario at a first reference brightness level, wherein the first color measurement includes a plurality of color measurement components indicating an amount of light detected by a respective one of a plurality of light detectors having substantially different spectral response profiles, and the plurality of color measurement components includes a first brightness color measurement component,
obtaining a second color measurement produced by the ambient color sensor in response to being exposed to the calibration ambient lighting scenario at a second reference brightness level that is less than the first reference brightness level, wherein the second color measurement includes a second brightness color measurement component,
calculating first sensor-specific per-cluster brightness correction parameters specific to the ambient color sensor based on at least the first brightness color measurement component and an average reference color measurement for the lighting cluster,
calculating second sensor-specific per-cluster brightness correction parameters specific to the ambient color sensor based on at least the second brightness color measurement component and an average reference color measurement for the lighting cluster, and storing the first sensor-specific per-cluster brightness correction parameters and the second sensor-specific per-cluster brightness correction parameters in association with the first lighting cluster in a non-transitory machine-readable storage medium included in the electronic device.

8. The method of claim 7, further comprising:
for each lighting cluster included in a first plurality of lighting clusters:
  obtaining a first generic per-cluster brightness estimation factor associated with the lighting cluster and for the first reference brightness level,
  obtaining a second generic per-cluster brightness estimation factor associated with the lighting cluster and for the second reference brightness level, and
  storing the first generic per-cluster brightness estimation factor and the second generic per-cluster brightness estimation factor in association with the first lighting cluster in the non-transitory machine-readable storage medium.

9. The method of claim 8, further comprising:
storing in the non-transitory machine-readable storage medium lighting cluster parameters effective for automatically identifying which of the first plurality of lighting clusters is associated with a color measurement obtained for the ambient color sensor; and
storing in the non-transitory machine-readable storage medium instructions which, when executed by the electronic device, cause the electronic device to:
  receive a third color measurement from the ambient color sensor, the second color measurement including a third brightness color measurement component indicating an amount of light measured by the first light detector,
  automatically select, using the stored lighting cluster parameters, a first lighting cluster, included in the first plurality of lighting clusters, as being associated with the third color measurement,
  select, from the stored sensor-specific per-cluster sensor brightness correction parameters, third sensor-specific per-cluster sensor brightness correction parameters based on the third sensor-specific per-cluster sensor brightness correction parameters being for the selected first lighting cluster,
  calculate a corrected brightness measurement component by applying the third sensor-specific per-cluster sensor brightness correction parameters to the third brightness color measurement component, and
  estimate a brightness of an ambient lighting encountered by the electronic device based on at least the corrected brightness measurement component.

10. An electronic device adapted to estimate a brightness for ambient lighting encountered by the electronic device, the electronic device comprising:
an ambient color sensor including a plurality of light detectors having substantially different spectral sensitivity profiles, the plurality of light detectors including a first light detector;
one or more non-transitory machine readable media in which are stored:
  lighting cluster parameters effective for automatically identifying which of a first plurality of lighting clusters is associated with a color measurement obtained for the ambient color sensor,
  generic per-cluster brightness estimation factors for each of the first plurality of lighting clusters, and
  instructions which, when executed by the electronic device, cause the electronic device to:
    automatically select, using the stored lighting cluster parameters, a first lighting cluster, included in the first plurality of lighting clusters, as being associated with the first color measurement,
    receive a first color measurement from the ambient color sensor, the first color measurement including a brightness color measurement component indicating an amount of light measured by the first light detector,
    in response to the brightness color measurement component being less than a low brightness threshold, select, from the generic per-cluster brightness estimation factors, a first generic per-cluster brightness estimation factor associated with the selected first lighting cluster and for a first reference brightness level as a selected generic per-cluster brightness estimation factor, and
    estimate a brightness of an ambient lighting encountered by the electronic device based on at least the selected generic per-cluster brightness estimation factor.

11. The electronic device of claim 10, wherein the instructions further cause the electronic device to, in response to the brightness color measurement component not being less than the low brightness threshold, select, from the generic per-cluster brightness estimation factors, a second generic per-cluster brightness estimation factor associated with the selected first lighting cluster and for a second reference brightness level less than the first reference brightness level as the selected generic per-cluster brightness estimation factor.

12. The electronic device of claim 10, wherein the instructions further cause the electronic device to:
calculate a corrected brightness measurement component by applying first sensor-specific sensor brightness correction parameters to the brightness color measurement component, and
estimate a brightness of an ambient lighting encountered by the electronic device based on at least the selected generic per-cluster brightness estimation factor and the corrected brightness measurement component.

13. The electronic device of claim 10, wherein:
the one or more non-transitory machine readable media further store second sensor-specific per-cluster sensor brightness correction parameters for each of the first plurality of lighting clusters, and
the instructions further cause the electronic device to select the first sensor-specific per-cluster sensor brightness correction parameters from the second sensor-specific per-cluster sensor brightness correction parameters based on the first sensor-specific per-cluster sensor brightness correction parameters being for the selected first lighting cluster.

14. The electronic device of claim 13, wherein:
the one or more non-transitory machine readable media further store third sensor-specific per-cluster sensor brightness correction parameters for each of the first plurality of lighting clusters, and
the instructions further cause the electronic device to:
  in response to the brightness color measurement component being less than a low brightness threshold, select the first sensor-specific per-cluster sensor brightness correction parameters from the second sensor-specific per-cluster sensor brightness correction parameters based on the first sensor-specific per-cluster sensor brightness correction parameters being for the selected first lighting cluster, and in response to the brightness color measurement component not being less than a low brightness threshold, select the first sensor-specific per-cluster sensor brightness correction parameters from the third sensor-specific per-cluster sensor brightness correction parameters.

15. The electronic device of claim 10, wherein the instructions for automatically identifying which of the plurality of lighting clusters is associated with the first color measurement, when executed by the electronic device, cause the electronic device to:

automatically identify, using the stored cluster parameters, which of a second plurality of lighting clusters is associated with the first color measurement, wherein the second plurality of lighting clusters includes a first lighting cluster included in the first plurality of lighting clusters and a second lighting cluster not included in the first plurality of lighting clusters; and in response to identifying that the second lighting cluster is associated with the first color measurement, automatically identify, using the stored cluster parameters, which of a third plurality of lighting clusters is associated with the first color measurement, wherein each of the third plurality of lighting clusters is included in the first plurality of lighting clusters.

16. The electronic device of claim 10, wherein the instructions further cause the electronic device to:

calculate a ratio of a first color measurement component of the first color measurement to a second color measurement component of the first color measurement; and use the ratio for the automatic identification of which of the first plurality of lighting clusters is associated with the first color measurement.

* * * * *